United States Patent
Rameshni et al.

(10) Patent No.: US 10,689,254 B1
(45) Date of Patent: Jun. 23, 2020

(54) METHODS FOR SO2 RECOVERIES FROM SULFUR PLANTS

(71) Applicants: Mahin Rameshni, Monrovia, CA (US); Stephen L. Santo, La Crescenta, CA (US)

(72) Inventors: Mahin Rameshni, Monrovia, CA (US); Stephen L. Santo, La Crescenta, CA (US)

(*) Notice: Subject to any disclaimer, the term of this patent is extended or adjusted under 35 U.S.C. 154(b) by 0 days.

(21) Appl. No.: 16/563,905

(22) Filed: Sep. 8, 2019

(51) Int. Cl.
| | |
|---|---|
| *C01B 17/04* | (2006.01) |
| *B01D 53/04* | (2006.01) |
| *B01D 53/50* | (2006.01) |
| *B01D 53/96* | (2006.01) |

(52) U.S. Cl.
CPC .......... *C01B 17/0465* (2013.01); *B01D 53/04* (2013.01); *B01D 53/50* (2013.01); *B01D 53/96* (2013.01); *C01B 17/0439* (2013.01); *B01D 2253/104* (2013.01); *B01D 2253/1122* (2013.01)

(58) Field of Classification Search
CPC . C01B 17/0404; C01B 17/0456; B01D 53/04; B01D 53/1481; B01D 53/50; B01D 53/508; B01D 53/82; B01D 53/96; B01D 2257/302; B01D 2258/0283; B01D 2259/40003; B01D 2259/40086; B01J 8/02
See application file for complete search history.

(56) References Cited

U.S. PATENT DOCUMENTS

| | | | | |
|---|---|---|---|---|
| 4,533,529 A * | 8/1985 | Lee | ...... | B01D 53/48 423/230 |
| 4,769,229 A * | 9/1988 | McGalliard | ...... | B01D 53/523 423/230 |
| 5,514,351 A * | 5/1996 | Buchanan | ...... | B01D 53/04 423/220 |
| 5,547,648 A * | 8/1996 | Buchanan | ...... | B01D 53/04 423/210 |
| 5,780,000 A * | 7/1998 | Strickland | ...... | B01D 53/04 423/220 |
| 6,776,974 B1 * | 8/2004 | Burmaster | ...... | B01D 53/8615 423/222 |

FOREIGN PATENT DOCUMENTS

| | | | | |
|---|---|---|---|---|
| EP | 0215709 A1 * | 3/1987 | ...... | B01D 53/8609 |
| EP | 1642864 A2 * | 4/2006 | ...... | B01D 53/1493 |
| FR | 2427299 A1 * | 12/1979 | ...... | C01B 17/04 |

\* cited by examiner

*Primary Examiner* — Timothy C Vanoy

(57) ABSTRACT

A method and system for abating the emissions of at least sulfur dioxide present in a tail gas emitted from sulfur recovery units are provided. The invention is characterized by the provision of at least two adsorber units in a parallel arrangement. While one adsorber is in an adsorption mode, it receives a gas contaminated w/ sulfur dioxide and adsorbs and removes the sulfur dioxide out of the gas. The other adsorber is in regeneration mode, and receives an acid gas stream comprising hydrogen sulfide as well as an oxygen-containing gas to regenerate the spent adsorbent material and produce an off-gas comprising hydrogen sulfide and sulfur dioxide. This off-gas is then recycled back to the sulfur recovery unit.

20 Claims, 11 Drawing Sheets

METHODS FOR SO2 RECOVERIES FROM SULFUR PLANTS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure is a method for SO2 recoveries from sulfur plants to reduce the sulfur emissions. The present invention is combinations of modifications of the prior arts which produces sulfur and other SO2 and H2S and the present invention is added to adsorbs the SO2 that is produced in the prior arts in other words to reduce SO2 emission by adsorbing the SO2 that is produced in the prior arts. The prior arts is required to be modified, optimized, resulting adding piping, equipment, catalysts and instrumentation where the present invention is added after the prior arts is qualified for the implementation. The present invention is as a supplement unit or polisher unit that serves only the prior arts in sulfur recovery and tail gas treating units.

The present disclosure is added to the prior arts of the sulfur technologies to reduce SO2 emission. As the results the prior arts is modified or optimized to achieve a better results with combinations of prior arts and the present invention overall 100% recovery is or zero SO2 emission is achieved. Therefore, since the prior arts generate a tail gas stream where is considered as the feed gas to the present invention; the description of prior arts are discussed in this application; considering the performance of prior arts has direct impacts on the present invention. The prior arts is modified and upgraded to have a more efficient performance as well as for the purpose of receiving a recycle stream from the present invention.

This disclosure relates generally to Process the remaining un-recovered SO2 from the prior arts in sulfur plant by innovative ADSORBENT/REGENERATION Process and by using two SO2 adsorbers consists of adsorbent catalysts. The Present Invention consists of 2 major vessels where they are switching between the adsorption and desorption or regeneration mode and they are located after the tail gas incineration and before the stack replacing of any other supplement unit similar to the caustic absorber system.

The adsorption mode operates at cold temperature to adsorb the SO2. The regenerator mode operates at hot temperature to regenerate the SO2 by adding a slip stream of the H2S acid gas stream and a slip stream of the air from the SRU air blower to the top of the adsorber that contains adsorbed SO2. The adsorbers consist of the adsorbents catalysts; H2S to react with the adsorbed SO2 in the vessel with oxygen present and the gas stream leaving the regenerator or hot adsorber is then recycled to a sulfur plant as a new stream to the prior arts of thermal section or downstream of the prior arts of Claus thermal section. The gas stream from the cold adsorber flows to the stack and it is SO2 free and zero emission is achieved.

In summary, the present invention comprises adsorption and desorption steps for recovering SO2 and H2S from a tail gas stream as a flue gas from the prior arts that is incinerated wherein, in the present invention first SO2 is adsorbed in a fixed bed adsorber and then desorbed by a regeneration gas which comprises a portion of the acid gas feed that generally flows to the prior art of a sulfur plant and returning the regeneration gas as the recycle to the prior arts of a sulfur plant. The sweeping gas flows the regenerator adsorber with a portion of the combustion air that normally fed to a prior art sulfur plant to remove the remaining of the un-recovered SO2 and H2S and returning the recovered SO2 and H2S to the prior arts sulfur plant. It means the prior arts sends a portion of its feed to the present invention, instead receives a new stream from the present invention that contains SO2 and H2S.

step 1) providing a flue gas stream from an prior art incineration unit into present invention two identical fixed bed adsorbers, one of said adsorber operating in a cool adsorption mode and the second adsorber operating in a hot regeneration mode, where each adsorber is capable of a cycle wherein the adsorbers operate in a hot mode and a cool mode, and the modes can alternate and during the cool mode the adsorber operates as an adsorbent and the in the hot mode the adsorber operates as a regenerator; step 2) when operating as a regenerator, said fixed bed adsorber comprises adsorbent catalysts used inside of each identical vessel; step 3) when operating as an adsorbent, said fixed bed adsorber receives a cooled incinerated flue gas outlet stream for the adsorption of SO2 from the prior arts tail gas stream; step 4) when said fixed bed adsorber operates in a regenerative mode or hot mode, providing a amine acid gas slip stream and an air slip stream from the prior arts into said adsorber to regenerate adsorbed SO2; step 5) said the present invention process further comprises control devices and motor operated switching valves to control the adsorber to enable switching or alternate modes between adsorption modes and regeneration modes to provide an outlet streams one stream being free of sulfur to be vented to the stack and a second stream comprising a the recovered sulfur components to be recycled to a prior art sulfur recovery unit; step 6) said outlet gas stream when the adsorber is operated in the adsorption mode produces sulfur-free flue gas which is vented or introduced to a stack; and the outlet gas stream when the adsorber operates in the regenerative mode is recycled back to a prior art sulfur plant or downstream prior art of a tail gas treating unit or injected to the thermal section of a Claus unit that includes a reaction furnace, or to the catalytic stages of a Claus unit that includes Claus reactors or Claus condensers and to a tail gas treating unit that includes tail gas hydrogenation reactor; and wherein, said process reduces the SO2 emissions from 50 ppmv to less than 10 ppmv.

The adsorbent catalysts are made specially shaped to perform efficiently from Alumina, promoted Alumina or titanium or combination materials in a form of adsorbent located in the adsorbers.

DESCRIPTION OF THE RELATED ART

In accordance with the present innovation, since the SO2 adsorbers are located after the prior arts incineration, all the sulfur compounds are already is converted to SO2 prior entering the SO2 adsorbers.

The specification describes the basic of the PRIOR ARTS sulfur recovery technologies (SRU) because the present invention is a supplement unit to prior arts of SRU's. The current invention is fed by a tail gas stream or flue gas from the prior arts SRU or TGU.

In prior arts, the most commonly used processes for recovering elemental sulfur from H2S is known as the modified Claus process. The modified Claus process can achieve the sulfur recovery of ranging 93-97% depends of the acid gas feed compositions. In the prior arts; a tail gas stream from a Claus unit has to be further processed in one of the common prior art tail gas unit technology; tail gas hydrogenation process followed by the amine tail gas to recover the remaining SO2 and H2S by achieving about 99.9% recovery meaning the stack may still contains up to 250 ppmv of SO2. The treated gas from the tail gas absorber flows to the incineration system where the stack has to meet the required emission of SO2 less than 250 ppmv and even in some locations less than 50 ppmv of SO2 even as low as 10 ppmv. In some facilities, the prior Claus is followed by a tail gas type as sub dew point reactors or direct reduction and oxidation where overall recovery is up to 99.5% without conventional TGTU and it is not possible to meet SO2 emission less than 50 ppmv without additional polishing unit whereas we refer to present invention to adsorb SO2 and bring the SO2 emission to 10 ppmv.

The prior arts; Sulfur plant operation is a very complicated and challenging job. Acid gas feed to a sulfur plant usually includes wide variation in the volume and concentration of H2S and other compounds, including a substantial amount of ammonia and amine acid gases in most plants. Theoretically, control of the thermal stage(s) using air, enriched air or oxygen for conversion of H2S to SO2 has permitted some processes to obtain extremely high recovery of sulfur whether for the 2:1 ratio for H2S to SO2 or for H2S-shifted operation but it still needs a polishing unit similar to present invention to adsorb the remaining of SO2.

The SO2 adsorbers in the present invention refer to a special design configuration where each adsorber contains special adsorbent catalysts; operates as SO2 adsorbent in cold mode and as SO2 Regenerator or desorption in hot mode; switching mode of operation takes place by using the switching valves and over the special adsorbent catalysts which are different from the Claus catalysts.

The present innovative process is not a sub dew point process where the bed become saturated with sulfur, instead, the present invention process are fixed bed adsorbers that requires heat up and cool down for the SO2 adsorption-based process without producing any sulfur. The adsorbers are located after the incineration system before the stack replacing any type of the non-regenerable limestone or caustic absorber system.

In the prior arts, any Claus process with 1, or 2 or 3 Claus stage; it is required to have a tail gas treating system to process the remaining H2S and SO2 from the Claus unit to maximize the production of liquid sulfur. The present innovative system is the adsorption process; it is not a Claus process; therefore, it will not produce any liquid sulfur.

In the adsorption mode the cooled stream from the prior arts incineration flue gas flows to the adsorber where SO2 is absorbed by the adsorbent catalyst. In the regeneration mode in the hot mode a slip stream of the acid gas feed of the amine gas which normally goes to the prior arts of a Claus unit, and a slip stream of air from the combustion air blower flows to the regenerator adsorber to regenerate the SO2; where the desorbed SO2, H2S and any SO2 and H2S are swept by air and recycled. The chemical reaction take place and H2S, SO2 and sulfur compounds are the minimum components that are recycled back from the present invention as a new stream to the prior art of a thermal or catalytic stage of a Claus unit.

The present invention adsorbers also contain adsorbent catalysts with special shape of alumina, promoter in alumina, or any combination of suitable adsorbent catalysts whereas the present invention has completely different catalysts from Claus catalysts. The prior art Claus unit contains alumina, Titanium, direct oxidation, direct reduction and any combination of suitable Claus catalysts in different shape, size and applications. The purpose and the function of adsorbent catalysts and method of production are different from the Claus catalysts.

In accordance with the current innovation, the gas leaving the cold adsorber; it is SO2 free and flows to the stack and the gas leaving the hot adsorber consisting of H2S, SO2 and sulfur compounds as minimum where it is recycled back to a prior arts Claus units, the air from the combustion air blower and amine acid gas both have the adequate pressure to force the recycle back to a Claus unit.

In accordance with the current innovation, the SO2 adsorber operates at 125 C to 130 C to maximize the SO2 adsorption and the So2 adsorber regenerator operates at 320 C to 400 C to maximize the SO2 regeneration or desorption.

Since the adsorbent must be able to tolerate oxygen from the air stream, and must also have capability to catalyze the process in the regeneration step, the oxygen adsorbent catalyst is located at top layer of the SO2 adsorbent catalysts. The lab data shows that oxygen adsorbent catalyst exhibits stable and reproducible SO2 adsorption. The regeneration procedure accomplishes a number of chemical transformations, most importantly, SO2 is recovered very fast where the H2S stream was present. It is noted that the regenerated stream will be enriched in SO2, if plant operates at H2S/SO2 ratio larger than 2, one advantage of this innovation is that advanced ratio control is not necessary as the SO2 adsorption steps acts to mitigate any variations in ratio. In practice, the plant will be controlled by ratio measurement and control on the tail gas process stream with the value set at 2:1 (H2S/SO2 ratio) to optimize conversion of the sulfur in the Claus reactor.

The present invention is considered as a polishing unit and it has to be located after a tail gas incineration; in other words the present invention has to be added to prior arts of sulfur plants not as a replacement but as a supplement polisher; then sulfur plants with the present invention can meet minimum of 99.99%+ sulfur recovery; the emission of less than 10 ppmv of SO2 can be achieved which is near 100% sulfur recovery or zero SO2 emission.

The present innovation is SO2 adsorption/regeneration wherein achieves zero waste, all SO2 and H2S is recovered to its maximum level.

In accordance with aspects of the present invention, the switching valves are located on the inlet and outlet streams to comply with mode of operation.

The present innovation can be added after a incineration to increase the recovery even where the tail gas treating may already be present like; Beavon Tail gas Treating, SCOT type tail gas treating unit, Cansolv type tail gas treating; or it can be added to any sub dew point tail gas processes like Smartsulf, SuperSulf, MCRC CBA, and Sulfreen or similar; and can be added to SuperClaus, EuroClaus, SMAX, and SMAXB or similar; it can be added to sulfur recoveries in mining where the majority of SO2 is reduced to sulfur and the remaining after the incineration has to be captured; and resulting is that the present invention to be added after incinerations or to replace any type of existing limestone or caustic absorber like DYNAWAVE or similar.

There are many existing prior arts of sulfur recovery and tail gas treating units in operation worldwide that do not meet the new regulations. The common solution has been option (A) to add any type of the limestone or caustic absorber system after the incineration to capture the SO2 before is routed to the atmosphere which creates liquid waste stream. The disadvantage of the limestone or caustic absorber is that it creates a new liquid waste stream so called spent limestone or spent caustic. However the present invention is considered as option (B) by adding the SO2 Adsorbers.

The spent caustic is the waste stream needs to be disposed safely or neutralized where in some facilities dealing with the spent caustic is a major issue. The present invention does not generate any waste stream. The key advantage is that the additional SO2 and H2S are recovered and sent back to the prior arts of sulfur plant. The present invention is cost competitive solutions and do not need any chemicals, and not generate any waste stream and most importantly, the emission is near zero without using any chemicals or solvents. The adsorbent catalysts life is 4-6 years, and is replaced according to the guideline just like other catalysts.

The switching valves for the present invention are 2-way or 3-way motor valves where they operate automatically switching between two adsorbers for cold and hot operation within 24 hours.

The capital cost of adding a conventional prior art tail gas unit is very close to the cost of a modified conventional Claus unit; considering the purpose is to recover only the remaining SO2 and H2S average 5% which, were not recovered in the Claus unit, the fact is that it is not cost effective.

The present invention has the capability to modify the prior arts sulfur recoveries adding equipment, replacing the catalysts plus adding the present invention resulting still less equipment and lower capital cost, lower maintenance, smaller plot space, and easy to operate.

The present invention could be used for the existing Claus units as the prior arts by implementing the required modifications and adding the present invention after the incinerations. Adding the present invention to grass roots sulfur plants it means to eliminate using expensive selective amine solvents, no need to recycle the pit vent, resulting to achieve much higher sulfur recovery up to 100% or basically zero SO2 emission with less capital costs.

If the present invention is added to the existing units; then the modification for the purposes of lowering SO2 emission such as using more expensive amine solvent can be eliminated.

The pit vent from the sulfur pit is routed to the prior art incineration traditionally and recently is routed to the prior arts of Claus unit to reduce the stack emission. Using the innovative SO2 Adsorbers process, the pit vent is routed to incineration again, because ultimately it is burned in the incineration and among other stream is recycled back to the prior arts of Claus unit, so it is less expensive to send the pit vent to the incineration and still meet the emissions.

There are numbers of patents are listed below as a prior arts regarding the Claus type to produce liquid sulfur as a reference and to show the differences with the current invention. The current invention can be added to all of these prior arts simply to control or eliminate the SO2 emission; but cannot be replaced by any of prior arts simply the current invention does not produce any sulfur.

In the prior arts US Granted Patents (U.S. Pat. No. 8,617,509 B1, Dec. 31, 2013), (U.S. Pat. No. 8,465,722 B2, Jun. 18, 2013), and (U.S. Pat. No. 8,425,874 B2 Apr. 23, 2013) and (US 2006/0288919 A1, Dec. 28, 2006) by M. Rameshni and S. Santo describes the SO2 conversion to sulfur by using proprietary design of reaction furnace and the reactors where the majority of SO2 is converted to sulfur. The tail gas stream from these technologies are processed in a prior arts type of tail gas treating and followed by incineration. The incineration outlet still contains SO2 where the present invention is added after the incineration where the SO2 adsorbers recovers SO2 and recycled back to these units. The present invention does not produce and sulfur and it is a polishing unit to reduce SO2 emission by adsorbing and regenerating SO2 to recycle back to the process unit.

In the patent (US patent 2017/0190574) by Ercan et. al the referred patent is the alternate to Claus process a process to produce stream of sulfur using furnace, thermal section and catalytic section of Claus type unit, absorber or sub dew point or any type of sulfur production, the main difference is that the present invention is not a Claus unit, does not have any furnace or reactors and will not produce any sulfur. The present invention is polishing unit after any sulfur recovery and tail gas treating units including the referred patent.

In patent application, (U.S. Pat. No. 4,482,532, dated Nov. 13, 1984, Standard Oil Company), (U.S. Pat. Nos. 5,015,459, 5,015,460 dated May 14, 1991, 4601330 dated May 20, 1985, by Amoco) and (U.S. Pat. No. 8,815,203 dated Apr. 17, 2013, J. Lamar) describes a process of Sub Dew Point process known as Cold Bed Adsorption (CBA) acts as the tail gas unit where the main difference are these reactors operate as sub dew point process and no stream gas from these reactors are recycled to the Claus unit. In accordance to the present invention; it does not operate as sub dew point process but operates as the adsorption process in addition the regenerated gas stream is recycled back to a Claus unit and sulfur is produced.

In patent application, European patents, (EP-983252, dated Jul. 5, 1997), (EP-2594328, dated 21 Nov. 2011), (EP-1621250, dated 29 Jul. 2004), (EP-963247 DE-19754185, dated Jun. 12, 1997, (EP-1002571, dated Jun. 11, 1998) by Dr. Michael Heisel through Linde, DEG Engineering and ITS engineering and (EP-14307188, dated 24 Dec. 2014) by Prosernat; where known as Smartsulf reactors. In this process there are 2 identical reactors equipped with internal cooling as the tail gas section; to produce liquid sulfur and to regenerate the sulfur as the sub dew point process; while the present invention do not have any internal cooling, do not operate as the sub dew point process, does not produce sulfur and it operates as the adsorption process and the regenerated gas stream is recycled back to sulfur plants to achieve lower SO2 emission.

In the patented process, May 5, 2015 (U.S. Pat. No. 9,023,309 B1) by M. Rameshni; known as SMAX AND SMAXB the zero emission is achieved by using any type of the caustic absorber system after the incineration where disposal of the waste spent caustic and using chemical are disadvantages of this process, the caustic absorber system can be replaced by the present invention without generating any waste, without using any chemicals and the actual SO2 and H2S is recovered by the recycling of the regeneration back to the prior art Claus unit.

In the patent process Apr. 18, 2017 (U.S. Pat. No. 9,624, 106 B2) by M. Rameshni is a sub dew point process that produces sulfur and the maximum recovery could be up to 99.5% while if the present invention as a polishing unit is added after an incineration, the recovery where to boost the recovery to 99.99%.

The present invention is a main key differentiator as SO2 adsorbers and desorption regenerator where the regenerator adsorber outlet is recycled to a prior arts Claus units such as recycling to CBA, MCRC, Smartsulf, SuperSulf, Sulfreen or any commercial Sub Dew Point processes and even processes like SuperClaus, EuroClaus, SMAX, SMAXB where there is no recycle to the prior arts Claus units but is required to meet the emission. In addition the present invention is added to the prior arts such as BSR, SCOT, RICH-MAX, ARCO, TG-MAX or any commercial tail gas treating system where the zero SO2 emission is required to replace a caustic scrubber system after the incineration to all above prior art processes. While the present invention is the unique adsorbent unit in fact the remaining recovered sulfur components from the present invention are recycled back to the prior arts.

The main difference between the caustic scrubber system and the present invention is that using caustic scrubber requires using chemical as caustic on regular basis, caustic absorbs the remaining of sulfur compounds in form of SO2 and produce spent caustic where the unrecovered SO2 and H2S is wasted, in addition, it requires disposal of the spent caustic or neutralization; however, the present invention do not require any chemicals, do not generate any chemical waste and unrecovered SO2 and H2S are separated and recycled back to a Claus for further recovery and finally environmentally acceptable.

In accordance with the new discloses process; the present invention represents the adsorption of SO2 in a cold bed and then the regeneration of the SO2 and H2S in a hot bed by using air and acid gas stream at the adequate temperature to achieve for additional SO2 recovery that would be wasted otherwise.

In accordance with the present invention, the slip air stream is taken from the main combustion air blower and the slip acid gas stream is taken from the main amine acid gas feed streams where both streams have adequate pressure and driving force to push the recycle back to a prior art Claus unit. The main purpose of adding the H2S stream to promote faster regeneration and the main reason of adding air stream to establish the desorption temperature as well as to sweep the desorbed SO2 and H2S to the prior arts SRU's.

BRIEF SUMMARY OF THE INVENTION

The present invention relates to a process for recovering SO2 from any type of prior arts sulfur recovery and tail gas treating units before vented to the atmosphere. According the present invention, SO2 is adsorbed in a cold bed adsorber by adsorbent catalyst as the results the gas leaving the cold adsorber to the stack is SO2 free. The cold bed adsorber containing adsorbed SO2 then switches to a hot bed adsorber to regenerate the adsorbed SO2 and H2S by using a slip air stream and a slip acid gas stream to establish desorption from the adsorbent catalyst and to regenerate the adsorbed SO2 and H2S. The gas stream leaving the hot adsorber is recycled back to a thermal or catalytic section of a prior art Claus unit.

The tail gas stream from a prior art Claus unit at least containing H2S, SO2, COS, CS2, CO2, H2O and sulfur derived from the second or third stage Claus unit that is equipped with thermal stage or direct oxidation catalytic stage is processed in the incinerator and then it flows to the present invention process.

The present invention consists of hot and cold adsorbers equipped with 2 or 3 way motor switching valves. The acid gas stream to the adsorbers is driven from the incinerator waste heat boiler where all the SO2 and H2S are converted to SO2.

The hot adsorber receives a slip stream of the feed which normally goes to the prior arts Clause unit; a slip stream of amine acid gas containing H2S and slip stream of air from the main combustion air blower.

The new innovative scheme will minimize the SO2 emission to stack in a very cost effective scheme. The switching valves are located on (1) the acid gas stream from the incineration waste boiler or a cooler containing SO2, (2) on the slip stream of the feed amine acid gas containing H2S, (3) on the slip air stream, (4) on the cold adsorber outlet to the stack, and finally (5) on the hot adsorber outlet that is recycled back to the prior arts Claus unit.

The SO2 adsorbers consist of adsorbent catalysts that are specially prepared as the adsorbent and they are not the same as Claus catalysts.

In accordance with aspects of the present invention, the flue gas stream flows to the incineration containing but not limited to H2S, NH3, HCN, H2, CO, CO2, O2 COS, N2, CS2, hydrocarbons, mercaptans, sulfur vapors and H2O where the sulfur compounds are converted to SO2 before entering the SO2 adsorbers.

In accordance with first aspects of the present invention, the incineration receives the tail gas stream from any type of prior art sulfur recovery and tail gas treating systems that may consist of thermal section; acid gas burner operates with air, enriched air with oxygen up to 100% oxygen or natural gas supplement; the catalytic section may consist of Claus reactors, sub dew point, direct oxidation, direct reduction reactors or TGU hydrogenation with relevant catalysts and with amine tail gas section, and may operate 2:1 ratio of H2S/SO2 or off ratio; regardless the flue gas containing SO2 from the prior arts incineration is processed in the present invention SO2 adsorbers.

In accordance with second aspects of the present invention, the flue gas tail gas stream from defined units is sent to the incineration system to convert all of sulfur compounds to SO2. The combusted gas is cooled and is sent to the present invention process that comprises two subsequent SO2 adsorbers contains the adsorbent catalysts and equipped with switching valves;

In accordance with third aspects of the present invention, the present invention consists of adsorption mode and regeneration mode of operation. In the adsorption mode the SO2 adsorber shall be cold 125 C to 130 C to maximize the SO2 adsorption, and in the regeneration the adsorber shall be hot at 320 C to 400 C to maximize the SO2 regeneration or desorption;

In accordance with forth aspects of the present invention the vent gas from the SO2 cold adsorber is free SO2 and flows to the stack and the vent from the hot adsorber flows back as the recycle to a thermal or catalytic stage of any type prior arts of Claus units;

In accordance with fifth aspects of the present invention where the present invention mode of operation is controlled by using the 2-way or 3-way switching valves. The switching valves are located on (1) the acid gas stream from the incineration waste boiler or the cooler, (2) on the slip stream of the feed amine acid gas, (3) on the slip air stream, (4) on the cold adsorber outlet to stack, and finally (5) on the hot adsorber outlet that is recycled back to any type of prior arts Claus units;

In accordance with sixth aspects of the present invention, the vent gas from hot adsorber containing SO2, and H2S where is recycled back to a prior arts Claus unit;

In accordance with seventh aspects of the present invention; SO2 adsorbers can be added after the incineration systems in any prior art sulfur plants that consisting of the conventional tail gas treating unit like Beavon, ARCO or SCOT, TG-Max, or any sub dew point processes like CBA, Smartsulf, MCRC, Sulfreen, and SuperSulf and Claus units containing direct reduction and or direct oxidation like SuperClaus, EuroClaus, SMAX and SMAXB in order to reduce the SO2 emission and to meet the new environmental regulations and to achieve zero SO2 emission;

In accordance with eighth aspects of the present invention, if there is any type of the caustic scrubber after the incineration, it can be eliminated and is replaced with the SO2 adsorbers;

In accordance with ninth aspects of the present invention, the prior arts of sulfur recovery and tail gas treating units are modified, optimized, by adding equipment, piping, instrumentation and catalysts, and finally adding the present invention after incineration.

In accordance with ninth aspects of the present invention, the cold adsorber operates at 125 C to 130 C to maximize the SO2 adsorption and the hot adsorber operates at 320 C to 400 C to maximize the SO2 regeneration.

In one preferred embodiment, the flue gas to the incineration maybe as the results of 2:1 ratio from the prior art operation; or with off ratio from the prior art operation is assured without affecting the SO2 emission;

In accordance with tenth aspects of the present invention; the present invention is also applicable for any type of prior arts Claus process for lean acid gas like Selectox or titanium reactors; where the flue gas is sent to the incineration and the present invention is added after incineration.

In accordance with embodiment of the present invention can be added to more complicated prior arts such as Partial tail gas enrichment unit as known as RICH-MAX or similar. The SO2 adsorbers can also be added where the prior arts sulfur recovery dealing with challenges of designing grass root SRU'S with a wide range of the H2S concentration. In this scheme the conventional reaction furnace is modified where a split stream of the amine acid gas flows to the tail gas absorber where the amine tail gas unit is designed as the Partial acid gas enrichment as known as RICH-MAX process. The treated gas from the TGU absorber overhead flows to the incineration and then combusted gas flow to the SO2 adsorbers. The prior arts amine regeneration overhead is recycled to a SRU after modification, to the second zone of the reaction furnace through the new repeater.

The new invention offers the following advantages:
(1) The SO2 adsorbers can be added after the incineration in any prior arts sulfur recovery process such as a conventional Claus, direct oxidation and reduction like SuperClaus, EuroClaus, SMAX, SMAXB or similar, after any prior arts sub dew point processes like CBA, Smartsulf, SuperSulf, MCRC, Sulfreen or similar, after any prior arts conventional tail gas treating units like BSR, ARCO, TG-MAX, SCOT and RICH-MAX or similar, and after prior arts tail gas catalytic or thermal incinerations.
(2) The catalysts used are adsorbent catalysts contains alumina, promoted alumina and Titanium, in a special shape for adsorbent but not limited to other materials CO, MO, Fe, Zn, Mg, Ni, Mo, Mn, Cr and Al, for conversion and desorption of Sulfur specious to H2S.
(3) Within the control fluctuations and deviations created under actual operating conditions of the prior arts modern sulfur plants, the SO2 adsorbers shall be able to achieve zero SO2 emission.
(4) The SO2 Adsorbers process consists of 2 adsorbers operate in hot and cold mode of operation to adsorb SO2 in the bed where the flue gas to stack is sulfur free and during the regeneration the adsorbed SO2 and H2S are recovered and recycled to the prior arts Claus unit without using any chemicals or solvents and without generating any waste stream like spent caustic. Basically no SO2 and H2S are wasted and fully recovered and environmental friendly.
(5) The switching valves are automated for changing mode of operations of adsorption and regeneration and the cycle time are defined as a function of SO2 has to be adsorbed.
(6) Finally it is the most cost effective option in regard to safety, ease of operation, create no waste, no chemicals is used and achieve near zero SO2 emission.
(7) The existing incinerator from the prior art may require modification, changing from natural draft to forced draft, adding the heat recovery before the present invention is added.

Many plants must recover sulfur from lean sulfur streams (from trace amounts to 30 mole percent) for which it is not suitable to apply a thermal stage due to the difficulty in sustaining stable flames therein. In conjunction with a catalytic first stage from the prior arts, using a direct oxidation catalyst such as Selectox or Titanium catalysts, the present invention is also applicable to more completely recover elemental sulfur from lean streams, for both the non-recycle and recycle processes using Selectox or similar catalysts, the present invention is also can be added.

The innovative SO2 Adsorbers are horizontal or vertical vessel depends on the size and normally made from high grade Carbon steel acid resistance with refractory or stainless steel.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

These figures present the combinations of the modified, upgraded, and revamped of the prior arts plus the present invention and recycling from the SO2 adsorbers to the prior arts. A block flow diagram is shown as FIG. 1 consists of the prior arts and figure B represents the modification to the prior arts plus adding the present invention. The diagram are simplified to show the differences between the prior arts and adding the present invention to them by conducting the proper modifications and to revamp the unit accordingly to piping and equipment. For new units all the necessary modifications and adding the present invention take place the same time.

Figure 1:
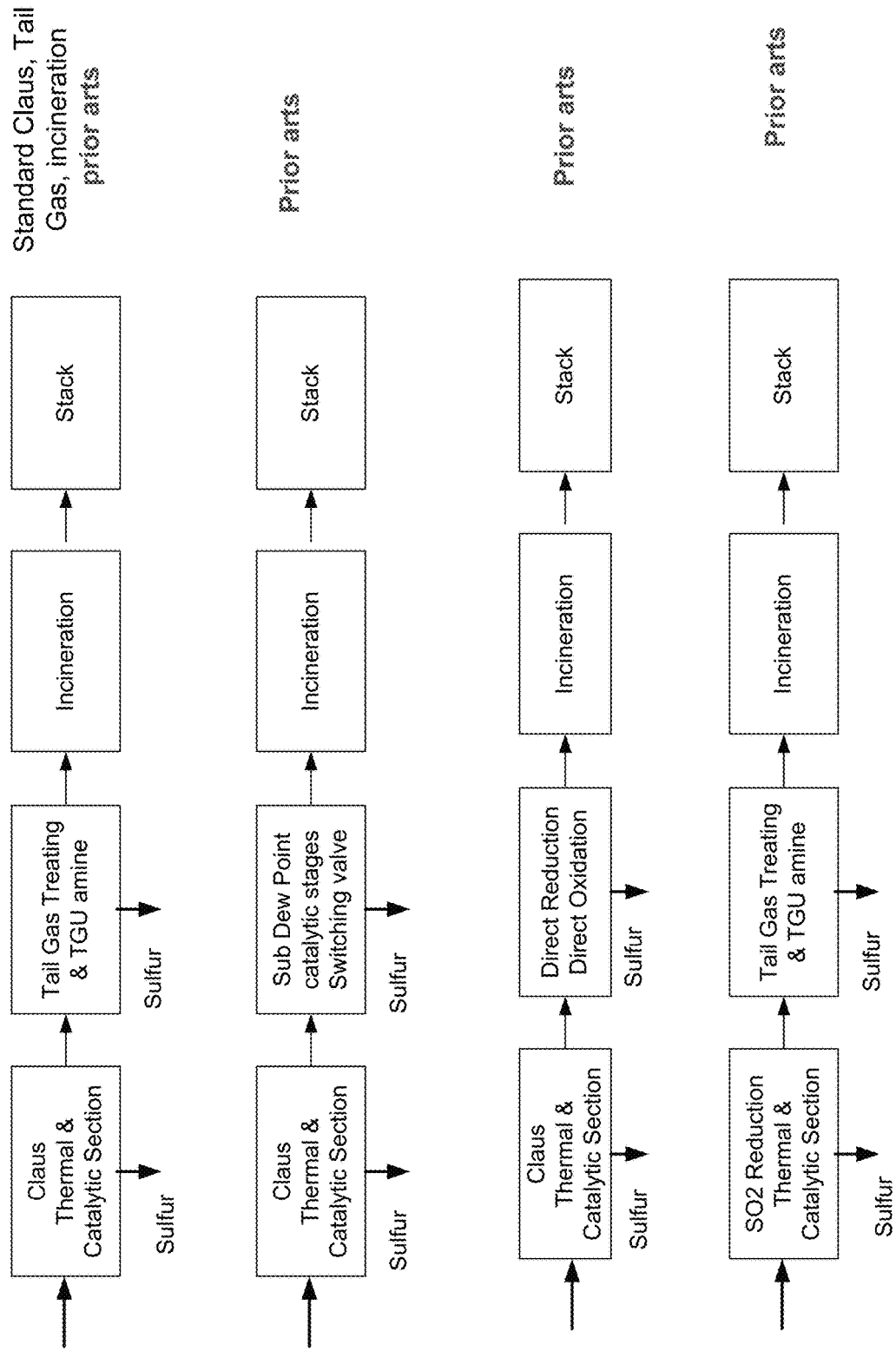
FIG. 1 represents the summary of the prior arts by itself and FIG. 2 represents the combinations of the prior arts with the present innovative SO2 Adsorbers process where it can be employed to variety type of prior arts Claus and tail gas treating. As the results of combinations of the prior arts with the present invention, several schemes as are discussed below. Even though Claus and tail gas are prior arts and the present invention is added however, the detailed description includes both the prior arts and the present invention as the polisher to show the benefits and results and advantages.

FIG. 1 (FIG. 1) represents a simplified block flow diagram which consists and represents different prior arts that has been discussed in this application as a reference and to prove the present invention is totally different with the prior arts.

Figure 2:
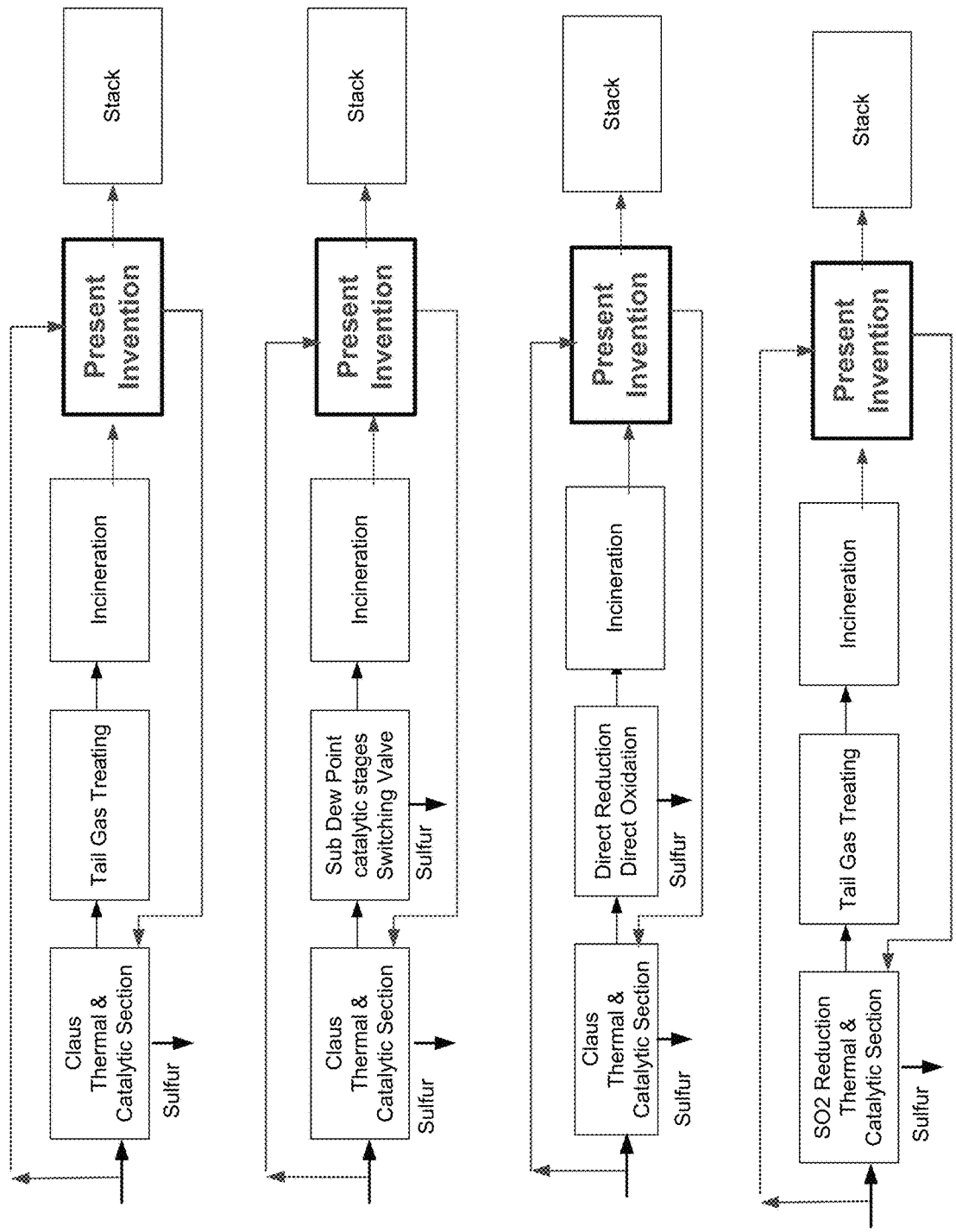

FIG. 2 (FIG. 2) represents the modification that needs to take place to the prior arts in order to improve the prior arts and be able to implement the present invention to that steps are taken. Basically FIG. 2 represents the combinations of the prior arts and the present invention including the necessary modifications is done where the combinations are implemented and can work together as improved schemes. It also proves that the present invention is a new unit that is added to the prior arts to reduce the SO2 emission and the present invention is totally new innovation and no similarity to any prior arts.

Figure 3:
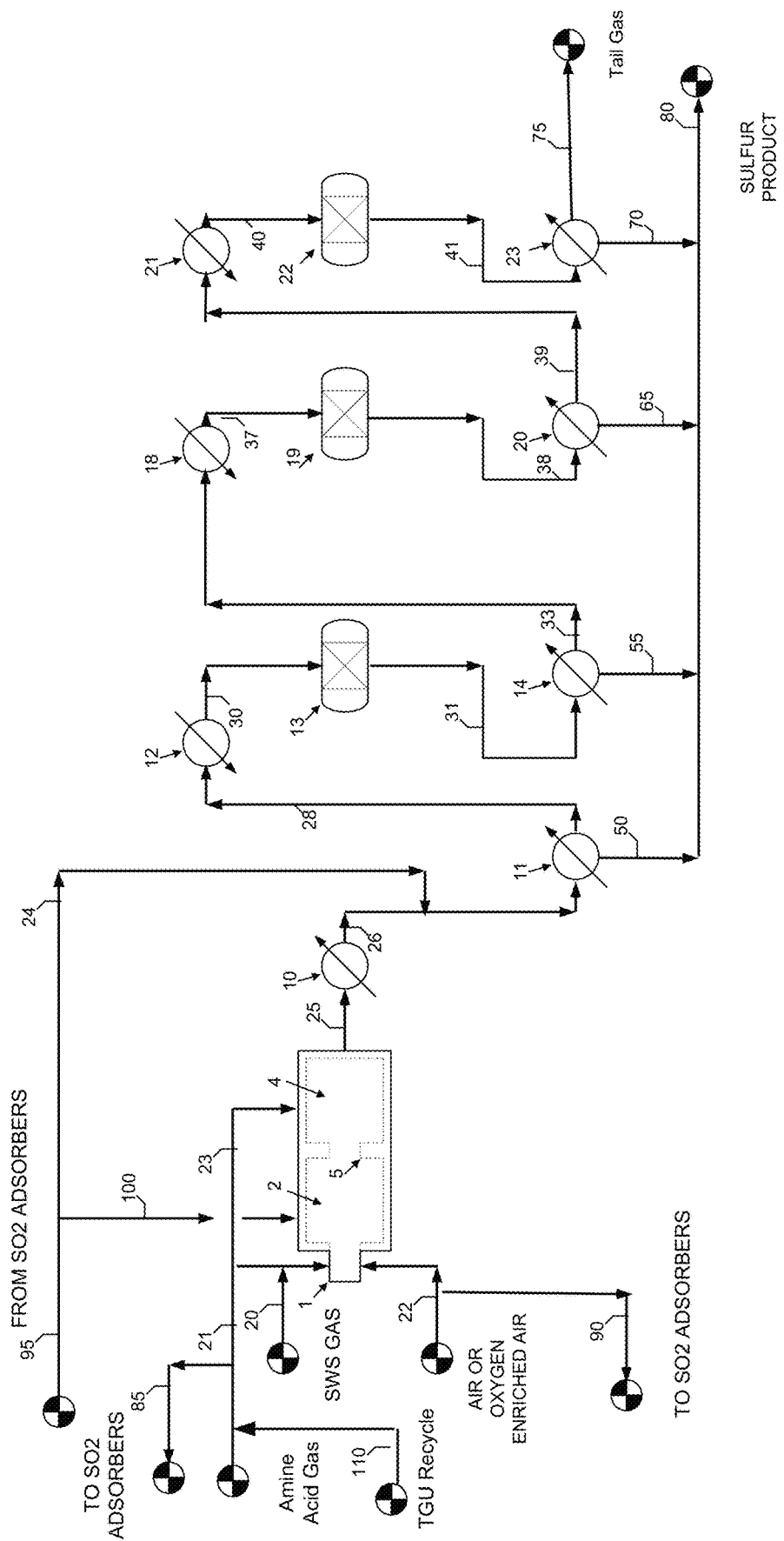
Figure 4:
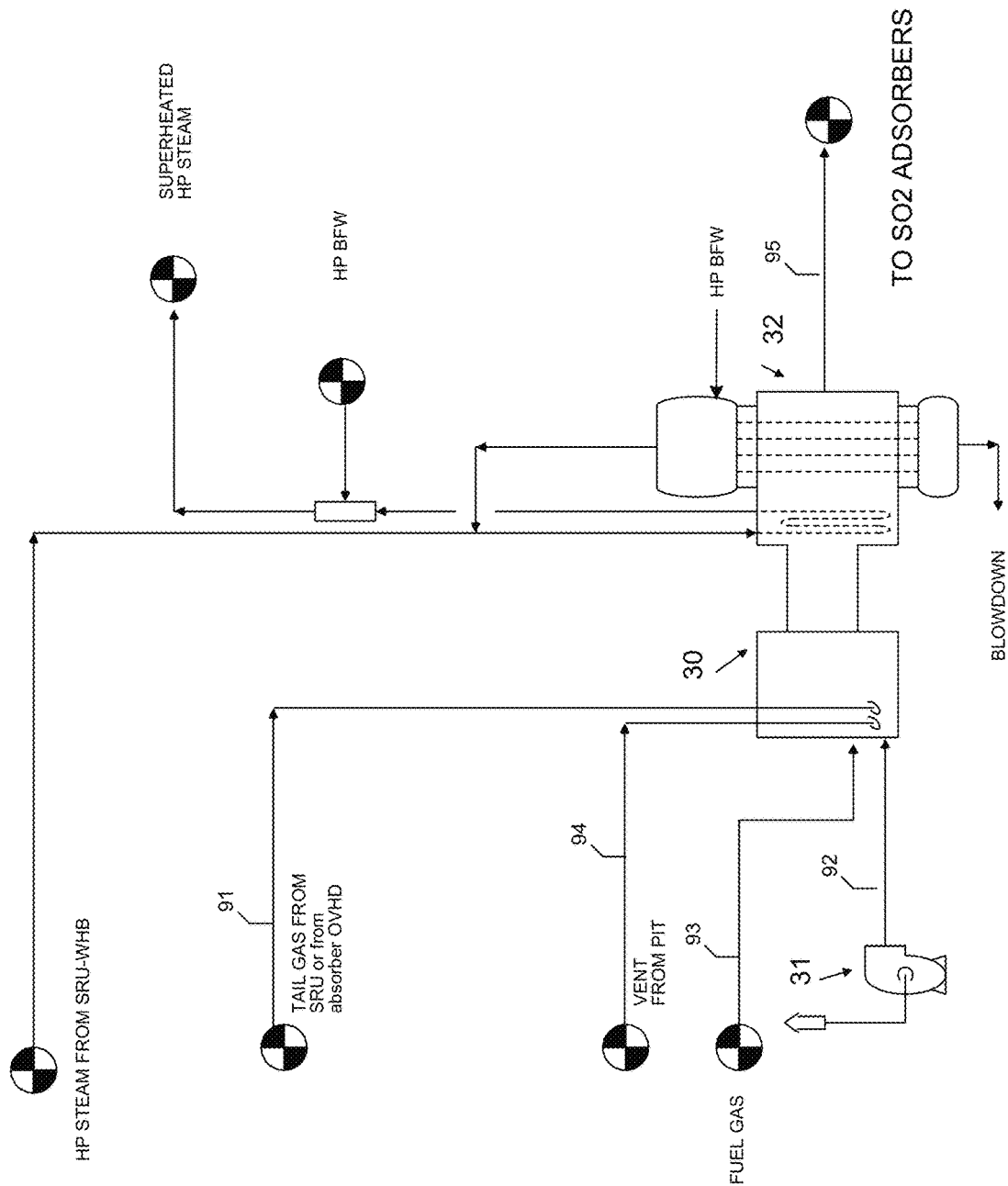
Figure 5:
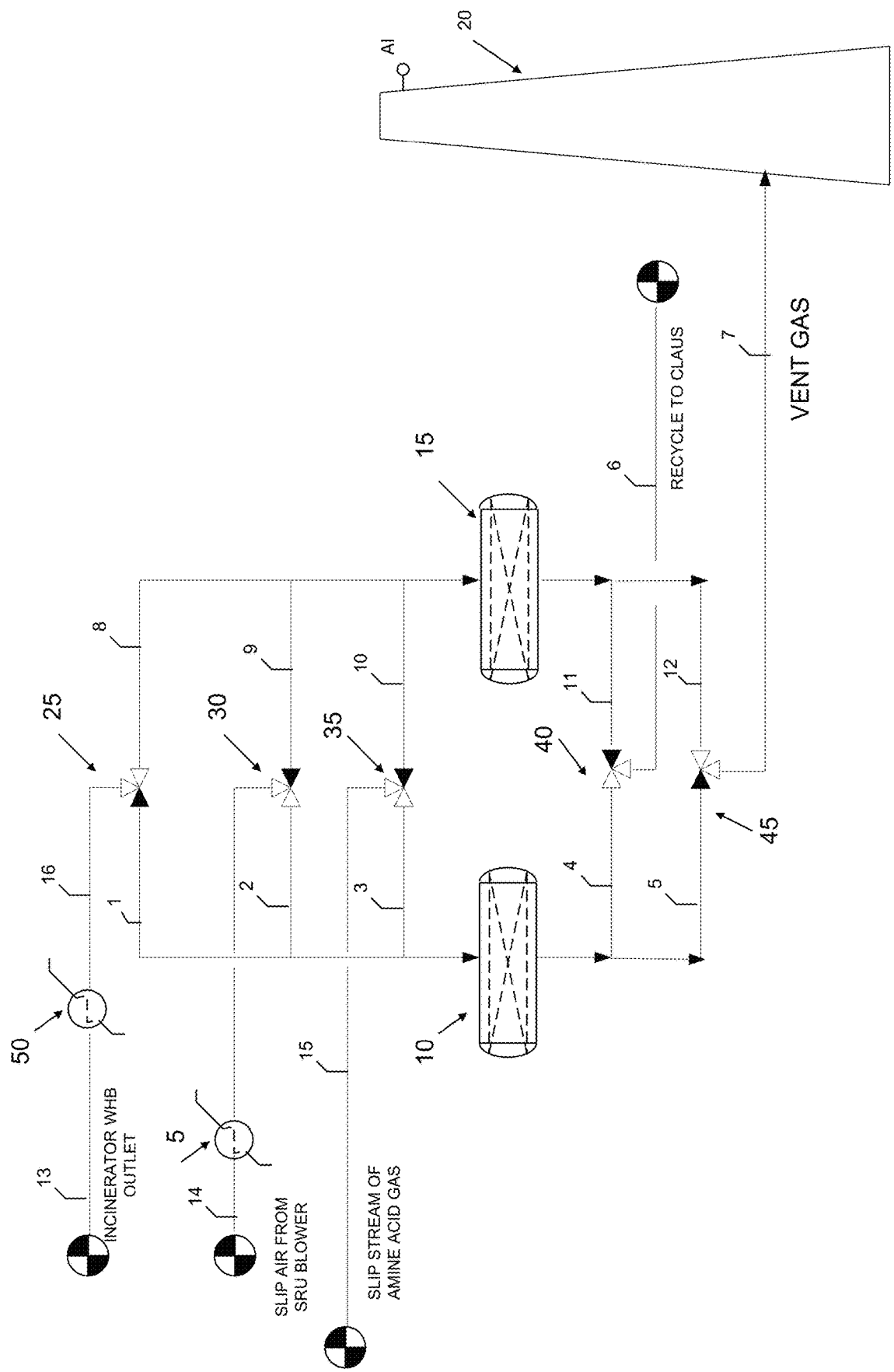

The first scheme consists of drawings, FIG. 3, FIG. 4, and FIG. 5 and illustrates a schematic diagram embodiment of the present disclosure consisting of (FIG. 3) existing arts Claus section which includes the thermal section and 2 OR 3 catalytic stages, (FIG. 4) the incineration system that receives the tail gas stream from the last condenser directly, (FIG. 5) the innovative SO2 Adsorbers scheme that receives the gas stream from the incineration outlet.

Figure 6:
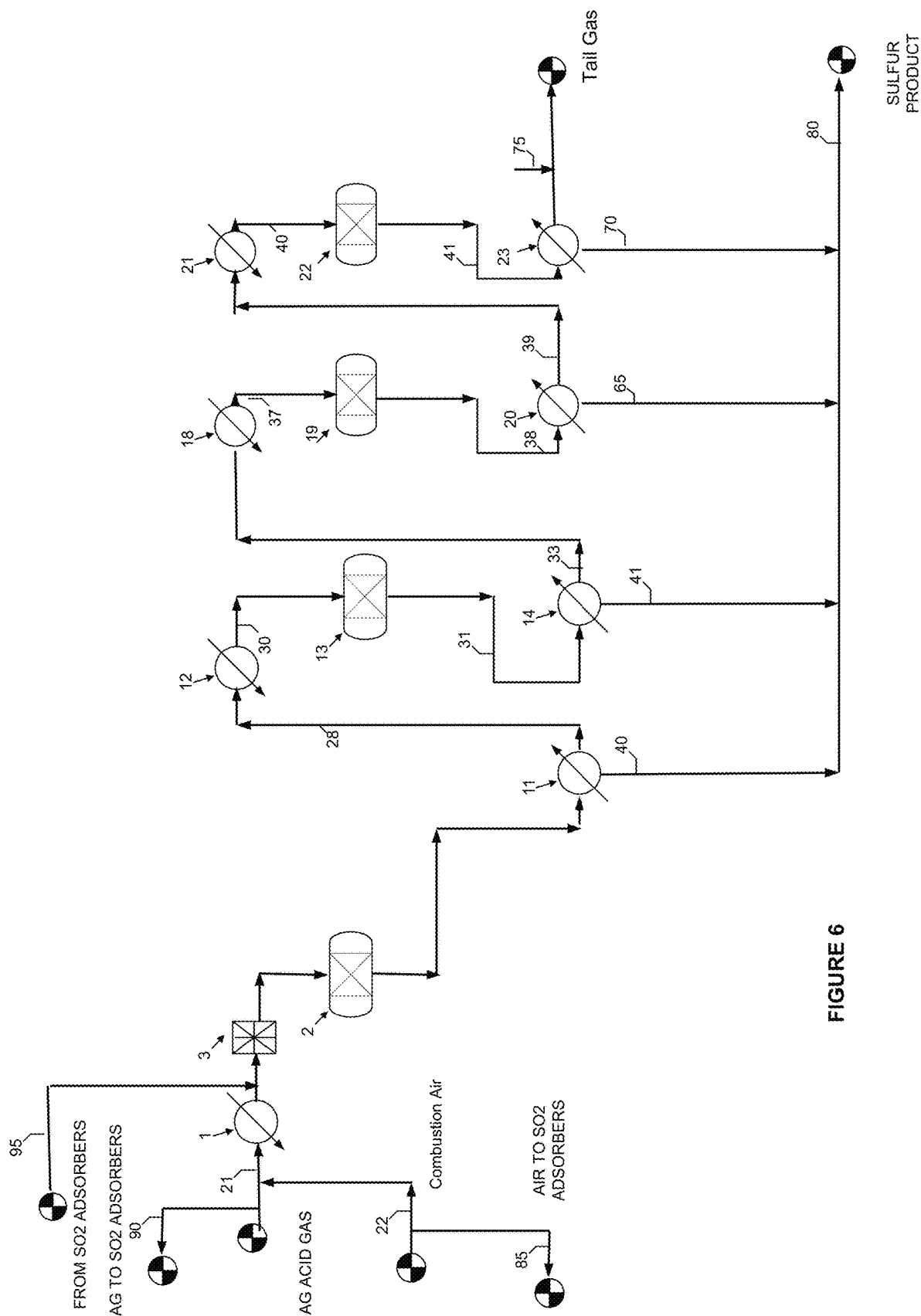

The second scheme consists of drawings FIG. 6, FIG. 4, and FIG. 5 where illustrates a schematic diagram of an alternate embodiment of the present disclosure consisting (FIG. 3) where the thermal section in FIG. 3 can be replaced with a prior arts direct oxidation catalytic stage for lean gas application. Upon the emission requirements SO2 Adsorbers is added to improve sulfur recovery as necessary stage followed by 2 or 3 Claus stages, (FIG. 4) illustrates the incineration system that receives the tail gas stream from the last condenser directly, (FIG. 5) the innovative SO2 Adsorbers that receives the gas stream from the incineration outlet.

Figure 7:
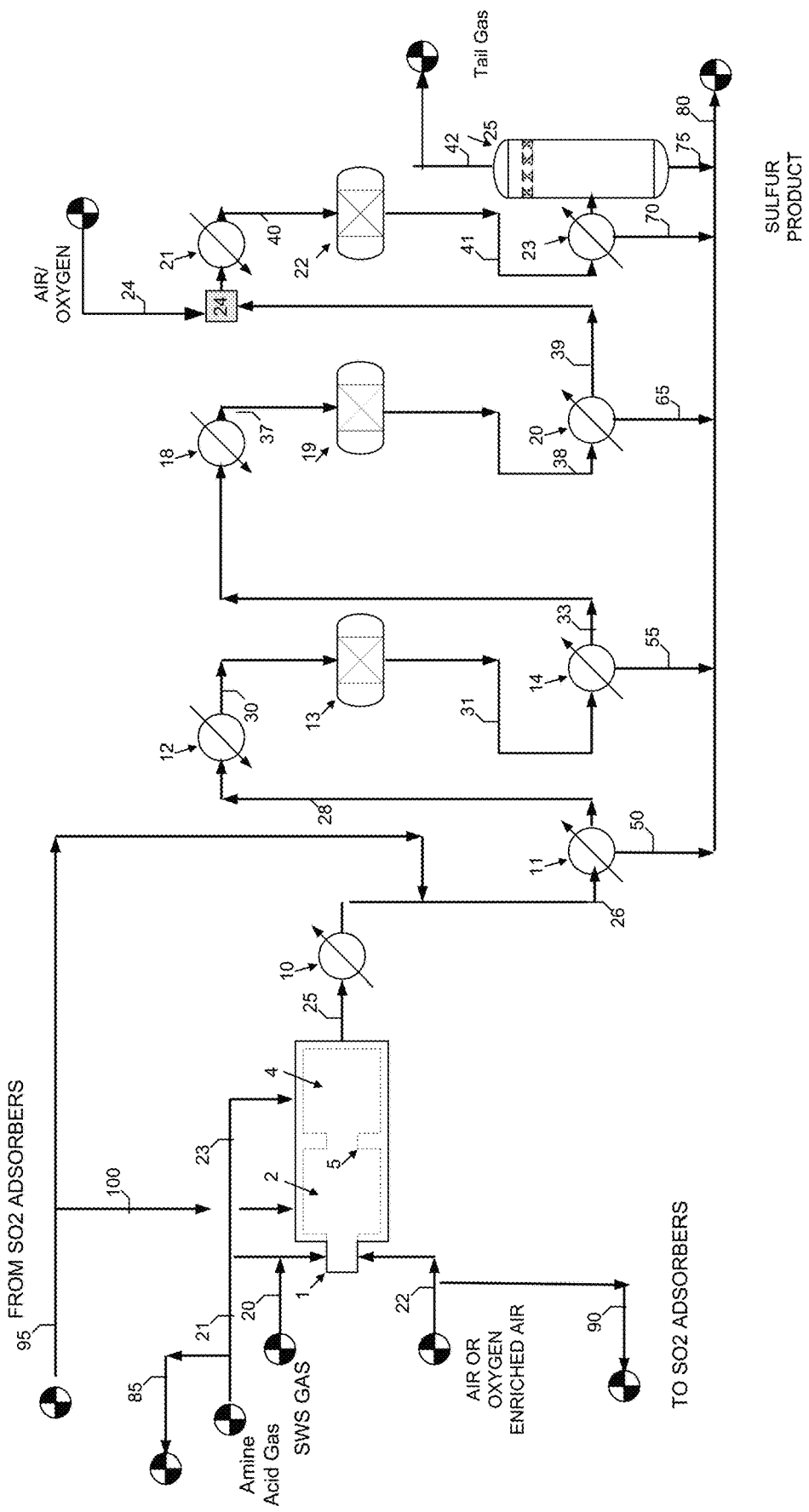

The third scheme consists of drawings FIG. 7, FIG. 4, and FIG. 5, where illustrates diagram of an alternate embodiment of the present disclosure illustrates the scheme from the prior arts patented process, May 5, 2015 (U.S. Pat. No. 9,023,309 B1) by M. Rameshni; as known as SMAX and SMAXB the zero SO2 emission is achieved by using the caustic scrubber system after the incineration where the caustic section is replaced by the SO2 Adsorbers innovative process.

Figure 8:
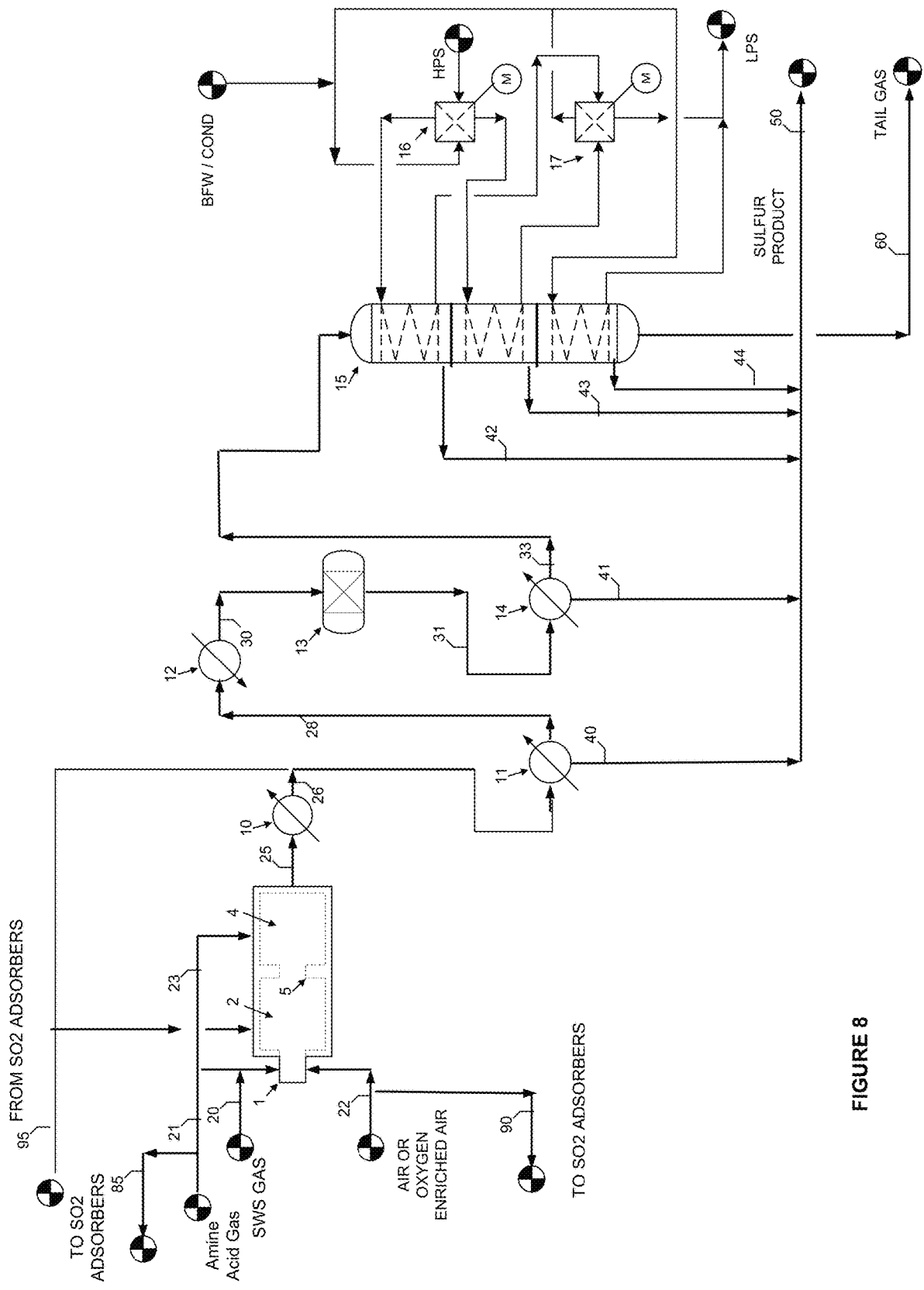

The forth scheme consists of drawings FIG. 8, FIG. 4, and FIG. 5, where illustrates diagram of an alternate embodiment of the present disclosure illustrates the scheme from the U.S. Pat. No. 9,624,106 B2, Apr. 18, 2017, the prior art SUPERSULF process where the zero SO2 emission is achieved by using the caustic scrubber system after the incineration where the caustic section is replaced by the SO2 Adsorbers innovative process.

The fifth scheme consists of drawings FIG. 3, FIG. 9, FIG. 4, and FIG. 5 where illustrates diagram of an alternate embodiment of the present disclosure illustrates the feed gas stream to the incinerator comes from the prior arts tail gas absorber overhead in the tail gas treating system.

The sixth scheme consists of drawings FIG. 10, FIG. 11, FIG. 4 and FIG. 5 where illustrates diagram of an alternate embodiment of the present disclosure illustrates the feed gas stream to the incinerator comes from the prior arts special design of the SRU and tail gas absorber as known as RICH-MAX where the tail gas absorber performs as the partial acid gas enrichment and the tail gas recycle is routed to the second zone of the reactor furnace.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts

DETAILED DESCRIPTION OF THE INVENTION

One or more illustrative embodiments incorporating the invention disclosed herein are presented below. Not all features of an actual implementation are described or shown in this application for the sake of clarity. The present invention is combination of modifications of the prior arts to make it suitable for adding SO2 adsorbers as the present invention after the prior arts meaning the stream exiting the prior arts enters the present invention and the recovered SO2 and H2S is recycled back to the prior arts. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for recovering SO2 by using SO2 adsorbers replaces the tail gas treating unit with less equipment while achieving zero SO2 emission without any waste stream or chemicals.

The present invention relates to processes for recovering SO2 for onshore and offshore applications; refineries, gas plants, IGCC, gasification, coke oven gas, mining and minerals sour gas field developments and flue gas desulfurization onshore and offshore wherein SO2 emission reduction is required for new units or revamps.

In accordance to aspects of this invention; the SO2 adsorbers operate as the adsorbent and as the desorption regenerator where the cycles are (cold, hot) and (hot, cold) to recover SO2 and H2S from the adsorbent. In addition, the combination of adsorption and regeneration operation are controlled by using 2-way or 3-way switching valves.

In accordance with aspects of the present invention, it is an object of the present disclosure to provide a process for SO2 recovery to reduce the SO2 emission and economically acceptable for, present day industrial operations and higher safety standard.

Another object is to provide such a process which can tolerate variances in operating conditions within a given range without major equipment adaptations. A further object is to provide a process which can be utilized in co-acting phases to provide, at acceptable economics, the capacity required in present-day industrial operations, easy to operate and more reliable and robust operation.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions. Finally, the present invention is a polisher to existing arts therefore, the existing arts and their variations scheme of existing arts are discussed where their last stream enters the present invention through incineration.

The figures illustrate steam reheaters that heats up the gas by using steam, however, any suitable heat exchanger, using different heating media, or fired reheaters using natural gas or acid gas, and hot gas bypass maybe employed in this service.

The figure illustrates a waste heat boiler that produces steam, however, any suitable heat exchanger, such as a water heater, steam superheater or feed effluent exchanger may be employed in this service.

The thermal section of sulfur recovery of the prior art is modified to receive the new recycle from the present invention SO2 Adsorbers. Therefore, the reaction furnace is modified with one or more checker wall or choke ring or vector wall to create the turbulent velocity of gas for a better mixing and to prevent cold spot and condensation. In addition the checker wall near the tube sheet of the waste heat boiler maybe added to protect the tube sheet from the heat radiation from the burner.

In accordance to this invention; the prior arts; sulfur plants is modified to improve the operation where the rate of the air, enriched air or oxygen enrichment stream is adjusted such that the mole ratio of hydrogen sulfide to sulfur dioxide in the gaseous-mixture reaction stream ranges from 1.5:1 to 10:1; where the tail gas is further processed in the present invention.

The innovative SO2 adsorbers process comprises the special adsorbent catalysts consisting of alumina, promoted alumina, and titania, but not limited to Iron with Zinc, Iron with Nickel, Cr, Mo, Mn, Co, Mg with promoter on Alumina and with any other combination or any other catalyst systems which are employed as the adsorbents and are not the same as Claus catalysts.

Once again, since the prior arts provides feed gas stream to the present invention and receive a recycle back containing SO2 and H2S; therefore, in the prior arts; the converters in the Claus conversion is modified for improvement to employ one or more Claus catalysts including alumina catalysts, activated alumina catalysts, alumina/titania catalysts, and/or titania catalysts, Iron with Zinc, Iron with Nickel, Cr, Mo, Mn, Co, Mg with promoter on Alumina and with any other combination or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % Al2O3, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

In accordance with certain aspects of the present disclosure, the prior arts of the sulfur recovery converters/reactors are modified and the associated condenser systems are adjusted to optimize the gas stream to the present invention as described herein. The prior arts are upgraded, modified, revamped, and optimized by adding suitable equipment, adding piping to provide feed stream to the present invention, adding recycle from the present invention, changing the catalysts in the converters, adding instrumentation, modified existing equipment the thermal or catalytic section to be suitable and the present invention is added to control the SO2 emission and to recover SO2 effectively.

With continued reference to the prior arts and the present invention, the tail gas stream exits the last reactor stage in the prior art may optionally be conveyed to any typical tail gas absorption process, BSR, SCOT, ARCO, and RICH-MAX, TG-MAX or similar and any type of incineration process prior entering the present invention SO2 adsorbers in order to recover SO2 and to achieve zero SO2 emission.

Accordance to the present invention the detailed description of the figures are in 2 steps: Step 1—the prior arts is designed and modified and operates according to the industry practice and using proper equipment and proper catalysts; step 2—SO2 Adsorbers are added where consisting of adsorption and regeneration mode of operation coordinated by 2 way or 3 way switching valves located after the prior arts incineration to receive a slip of air, slip of amine acid gas and the flue gas to each SO2 adsorber.

In the prior arts; the last condenser may be modified or replaced as at least one heat exchanger or multiple heat exchangers, dual condensers or combination of water coolers and air coolers to achieve maximum sulfur condensation and sulfur recoveries.

The present invention comprises that as the results of SO2 recovery; the SO2 emission from the stack is less than 10 ppmv or near zero.

All the heat exchangers defined in this process can be of any type of commercial exchangers such as but not limited to fired heaters, shell and tube, plate and frame, air cooler, water cooler, boiler type, or any suitable exchangers.

All required control systems in the prior and new arts are defined based on the latest commercial control systems and the prior arts is modified and updated to be suitable in combinations of the present invention which including but not limited to local panel, DCS control room, burner management systems in the sulfur plant, switching valves sequencer control systems, reactors, condensers, incineration and adsorbers and all necessary equipment in this innovation.

The sequence runs fully automatically without requiring any operator action. With the switch-over procedure finished, the zones changed their positions in the process and a new cycle starts as defined in the present invention.

Turning now to the first scheme consists of the figures, FIG. 3, FIG. 4 and FIG. 5. FIG. 3 and FIG. 4 are the prior arts after the modifications. In the FIG. 3 , in the prior arts reaction furnace (1) the acid gas streams, streams 20, 21 are partially oxidized with air, enriched air or oxygen, stream 22 in the reaction furnace combustion chamber zones; (no. 2 and no. 4) according to the basic chemistry of the Claus process. The acid gas stream is split into two streams where stream 21 is combined with the ammonia acid gas and the remaining of the amine acid gas stream 23 flows to the second zone of the reaction furnace (4) to provide enough flexibility to the operators by adjusting the split flow to achieve the required combustion temperature for destruction of ammonia and hydrocarbons. The choke ring or checker wall or vector wall located inside of the reaction furnace is shown (5). The sulfur is formed as a vapor, and other forms of elemental sulfur are formed in the gas. Combustibles in the gas will burn along with the H2S, and sulfur compounds are formed with their combustion products. Also, H2S will dissociate at high temperature forming hydrogen and elemental sulfur. The regenerator gas recycle from the SO2 adsorbers (95) is added to the reaction furnace stream (100) or it is added to the outlet of the waste heat boiler stream (24). The location of the recycle gas depends on the feed compositions that come from the SO2 Adsorbers regeneration reactor and the necessary adequate temperature to process the gas.

In accordance to the present invention SO2 adsorbers, a slip stream of the amine acid gas stream (85) and a slip stream of the air or air enriched stream (90) is sent to SO2 Adsorbers of the present invention unit to recover SO2 and H2S and recycled back to the prior arts Claus unit. Adding H2S will promote the SO2 desorption.

The slip stream of an amine acid gas acts as the regeneration agent to desorb the $SO_2$ and slip stream of air is adjustable to establish the proper temperature for desorption; the recovered SO2 and H2S to the prior arts sulfur plant resulting to achieve SO2 emission of less than 10 ppmv or near zero.

The prior arts of SRU, the reaction furnace is modified to receive the new stream from the present invention by adding a refractory checker wall for a better mixing of existing and new streams to prevent condensation and to protect the tube sheet of the waste heat boiler from the heat radiation from the burner.

In the prior arts of sulfur plant, No. 1 Condenser (11) the liquid sulfur is separated and flows to the sulfur pit as stream (50) and the gas stream (28) flows to the No. 1 Claus reheater (12) prior entering to the No. 1 Claus reactor (13), with inlet stream of 30 and the outlet stream of 31.

In the prior arts of sulfur plant, the outlet of the first Claus reactor stream 31 flows to the No. 2 condenser (14) where the outlet stream of liquid sulfur (55) flows the sulfur pit and the cooled gas stream (33) flows to the No. 2 Claus reheater (18) prior entering the No. 2 Claus reactor (19) with the inlet stream of (37) and the outlet stream of (38).

The outlet of the second Claus reactor stream (38) flows to the No. 3 condenser (20) where the outlet stream of liquid sulfur (65) flows the sulfur pit and the cooled gas stream (39) flows to the No. 3 Claus reheater (20) prior entering the No. 3 Claus reactor (22) with the inlet stream of (40) and the outlet stream of (41).

In the prior arts of sulfur plant, the outlet of the third Claus reactor stream (41) flows to the No. 4 condenser (23) where the outlet stream of liquid sulfur (70) flows to the sulfur pit and the cooled gas stream (75) tail gas stream flows to the incineration.

In the prior arts of sulfur plant, the outlet gas from the No. 1 condenser (11) stream 28 is heated indirectly in the No. 1 reheater (12) by high pressure steam and then stream 30 enters the No. 1 converter (13) which the converter contains mostly Titanium catalyst to hydrolyze the COS and CS2 formed from the thermal section of this invention (1) plus contains Claus catalyst types such as alumina and promoted alumina catalyst to perform the; as the results Sulfur is formed by an exothermic reaction, which creates a temperature rise across the catalyst bed.

In the prior arts of sulfur plant, in the FIG. 4, the incineration section the feed stream SRU tail gas stream (91) and the pit vent from the sulfur pit degassing vent stream (94) plus the fuel gas stream (93) flows to the incineration.

The incineration consists of a forced draft incinerator (30) and the air blower (31) and with the heat recovery (32). When heat is recovered then as part of energy saving, the additional steam is exported to the facility utility header. The combusted gas from the incinerator (30) is routed to the present invention SO2 adsorbers through the waste heat boiler (32).

In the FIG. 5 is shown The present invention; the SO2 adsorbers containing the adsorbent catalysts illustrates the heart of this invention by receiving the gas stream from the prior arts incineration system through a waste heat boiler or cooler where the combusted flue gas stream consisting the SO2 and H2S in the form of SO2 (13) cools off further by the cooler (50) and stream (16) enters the SO2 Adsorbers (10) where it operates at 125 C to 130 C to maximize the SO2 adsorption. In practice lower temperature will increase the adsorption capacity of SO2 but it is important to avoid the water dew point. In addition since the rate of the SO2 adsorption is required larger residence time than the prior arts Claus reactors therefore, the basis of design and sizing is different from the prior arts reactors.

The SO2 Adsorbers contain adsorbent catalysts including oxygen scavenger at the top bed due to oxygen presence from the incinerator and special type and size of adsorbent alumina at the bottom where these catalysts have important role during the regeneration process. The adsorbent must be able to tolerate some oxygen and must also have capability to promote the regeneration mode therefore, oxygen scavenger similar to titanium catalyst is provided in these SO2 Adsorbers.

The depth of the adsorbent catalyst beds used within the SO2 Adsorbers fixed bed is between 1 foot and 10 feet.

Turning to FIG. 5, the slip stream of the amine acid gas (15) and slip stream of air stream (14) from the combustion air blower flows to the present invention during the regeneration mode establishing a faster desorption of SO2 and H2S. The SO2 Adsorbers regeneration operates at 320 C to 400 C to maximize the SO2 regeneration. According to this innovation scheme, the regeneration procedure accomplishes a number of chemical transformations. Most importantly, SO2 is displaced by the hot gas and sulphate and thiosulphate which they are present on the surface of the adsorbent and after an uptake cycle are reduced by H2S in the regeneration stream of the amine acid gas, in addition any oxygen which is adsorbed in the uptake cycle will be removed by reaction with H2S.

The combusted flue gas from the prior arts incineration contains SO2, N2, CO2, H2S where will be adsorbed by the catalytic bed in form of O2, SO2, $S2O3^-$ and $SO4^-$. During the regeneration SO2 and $S2O3^-$ are desorbed and H2S and air is added the reactions are resulted in the Claus Equilibrium for the system.

$$H2S+3/2O2 \rightarrow 4H2O+SO2$$

$$SO2+2H2S \rightarrow 2H2O+3S$$

$$SO4^-/S2O3^-+H2S \rightarrow H2O,S,SO2,H2S$$

The SO2 Adsorbers innovative process is not a sub dew point process where the bed become saturated with sulfur, instead, the present invention are fixed adsorbent catalysts bed that requires heat up and cool down for the SO2 adsorption and desorption.

The slip stream of the amine acid gas and the air from the combustion air blower will provide the adequate pressure or driving force to recycle the regenerated gas to the Claus unit. The recycle is added to the reaction furnace or to the outlet of the waste heat boiler.

During the adsorption mode of operation the outlet from the adsorbent reactor (7) flows to the stack (20) which is sulfur free. During the regeneration mode of operation the outlet from the regeneration reactor (6) flows back to the Claus unit.

The cold and hot are the two mode of operation where the two SO2 Adsorbers switch by using the switching valves automated control system. The switching valves are 2-way or 3 way valves steam jacketed to prevent any plugging. FIG. 5 represents 5 switching valves as the 3-way switching valves (25, 30, 35, 40 and 45) located on 5 major lines "to and from" SO2 Adsorbers.

According to the present innovation process the SO2 adsorbers are switching between 2 mode of operation cold and hot, where each cycle take around 24 hours.

The switching valves are located on (1) combusted gas from the incinerator to the cold bed adsorbent stream (1 and 8), (2) air stream to hot bed regeneration stream (2 and 9), (3) amine acid gas to hot bed regeneration stream (3 and 10), (4) the outlet gas from the hot bed regeneration stream that is recycled back to the Claus unit stream 6 from (4 and 11), (5) the outlet gas from the cold bed adsorbent gas stream to the stack stream 7 from (5 and 12).

The prior arts modified incinerator stack (20) receives the gas stream from the present invention cold bed adsorber which is sulfur free, and the modified stack is equipped with the necessary analyzer monitoring system to measure the SO2.

In order to achieve the maximum adsorption and regeneration the streams 13, 14 and 15 temperatures are controlled by adding the proper cooling or heating exchangers.

The SO2 adsorbers replace any type of Caustic scrubber system such as DYNAWAVE or any similar system.

In accordance with the present invention, the SO2 Adsorbers process is cost competitive solutions and do not need any chemicals, and do not generate any waste stream, where the caustic scrubber system requires caustic as the chemical agent and spent caustic as the waste stream requires additional treatment to prevent any environmental issues.

The innovative SO2 Adsorbers contain components like SO2, $S_2O_3^-$ and $SO_4^-$ during the cold mode of operation, as the results the proper materials is chosen to prevent any corrosion.

Turing to the second scheme consists of the FIGS., FIG. 6, FIG. 4 and FIG. 5, where FIG. 6 and FIG. 4 are prior arts after the modification with combination of the present invention FIG. 5. The FIG. 6 is the same as FIG. 3 except the burner and reaction furnace is replaced by a catalytic direct oxidation where applies for the lean acid gas application. Acid gas flows to the repeater (1) then through the mixer (3) flows to a direct oxidation reactor (2) where air is added to the reactor to establish the adequate temperature for the desorption. The remaining description and the scheme is the same as FIG. 2 and the tail gas stream flows to the prior arts modified incineration system FIG. 4 and then flows to SO2 Adsorbers FIG. 5. The direct oxidation catalyst types are Selectox, Titanium, or any direct oxidation catalyst suitable for this process.

Turning to the third scheme consists of the FIGS., FIG. 7, FIG. 4 and FIG. 5, where the FIGS. FIG. 7 and FIG. 4 are the prior arts after the modifications with combinations of the present invention presented in FIG. 5. The FIG. 7 illustrates the modified prior arts from the patented process, May 5, 2015 (U.S. Pat. No. 9,023,309 B1) by M. Rameshni; where the slip streams are taken to the present invention SO2 adsorbers and the recycle from the present invention is added to the prior arts. The tail gas flows to the modified incineration system the FIG. 4 to convert all the sulfur components to SO2. The combusted product are cooled and flows to the SO2 adsorbers process which is illustrated as a new innovative process and it is shown as the FIG. 5 where the overall sulfur recovery of near zero SO2 emission is achieved.

Turning to the forth scheme consists of FIGS., FIG. 8, FIG. 4, and FIG. 5, where illustrates diagram of an alternate embodiment of the present disclosure illustrates the schemes from the modified prior art of patent regard to SUPERSULF process U.S. Pat. No. 9,023,309 Aug. 14, 2015) the slip streams is taken from the prior arts and is added to the present invention and the recovered SO2 and H2S is recycled back from the present invention to the modified prior arts.

According to the modified prior arts shown in the FIG. 8 up to 99.5% sulfur recovery can be achieved. The tail gas stream from the last condenser flows to the incineration system the FIG. 4 to convert all the sulfur components to SO2. The combusted product is cooled and flows to the SO2 Adsorbers process which is illustrated as a new innovative process and it is shown as the FIG. 5 where the zero SO2 emission is achieved.

Figure 9:
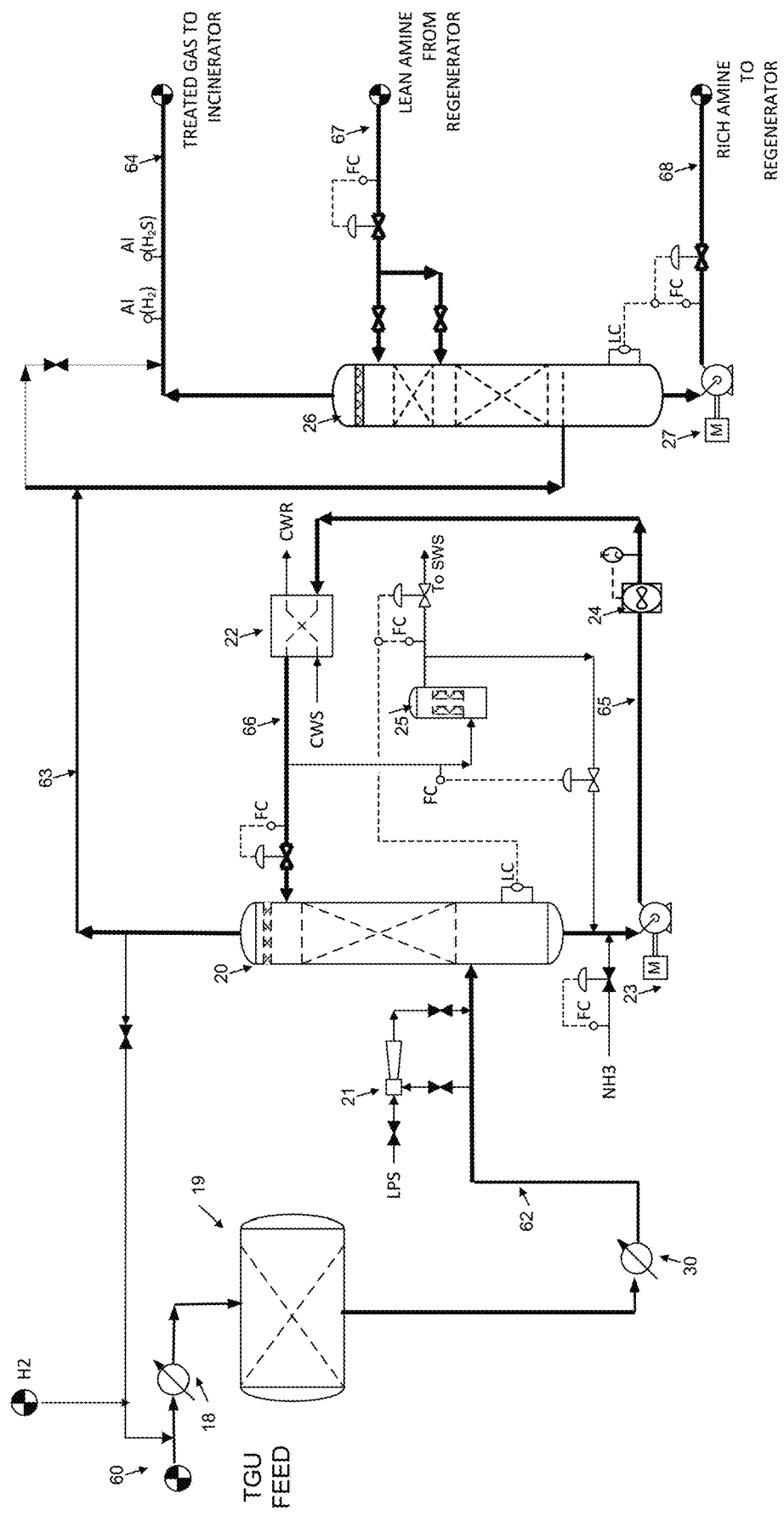

Turning to the fifth scheme consists of FIGS., FIG. 3, FIG. 9, FIG. 4, and FIG. 5 where illustrates diagram of an alternate embodiment of the present disclosure which the combination of the modified prior arts plus the present invention as shown in FIG. 5. It illustrates the feed gas stream to the modified incinerator comes from the prior arts tail gas absorber overhead in the prior arts tail gas treating system. FIG. 9 represents a conventional tail gas treating including the hydrogenation reactor, quench system and the amine unit such as BSR, SCOT, ARCO, RICH-MAX, TG-Max and any similar scheme. In the fifth scheme, the FIGS. FIG. 3, FIG. 4 and FIG. 5 is the same as the first scheme as described except in the FIG. 3 the acid gas slip stream to the new invention and the stream recycle from the present invention stream 110 from the amine regeneration overhead is added. If the sulfur plant includes the conventional tail gas treating with the amine section as shown on the FIG. 9 is a conventional tail gas treating where it receives the tail gas stream from the FIG. 3 for further processing to increase more recovery of H2S and the tail gas absorber overhead flows to the modified incineration into the FIG. 4 and finally the combusted flue gas flows to the FIG. 5 the present invention SO2 Adsorbers which is the current innovative process and it is already described under the first scheme.

Turing to the sixth scheme that consists of FIGS., FIG. 10, FIG. 11, FIG. 4 and FIG. 5 where illustrates diagram of an alternate embodiment of the present disclosure, combinations of prior arts and the present invention where the prior arts is modified to work with the present invention. It illustrates the feed gas streams to the modified incinerator comes from the special design of the SRU and tail gas absorber as known as the prior art RICH-MAX where the tail gas absorber performs as the partial acid gas enrichment and the tail gas recycle is routed to the second zone of the prior art reactor furnace.

In the prior arts RICH-MAX the acid gas is split the acid gas from the amine unit where up to 75% of the amine gas entered the first zone of the reaction furnace and the present invention and up to 25% of the acid gas is routed to the tail gas absorber stream (200) in addition to the quench overhead that flows to the tail gas absorber. The tail gas amine unit is designed with the much higher amine loading similar to the amine unit, so in Summary the FIG. 10 and FIG. 11 are similar to FIG. 3 and FIG. 9 as the modified prior arts accordingly except as noted.

Figure 10:
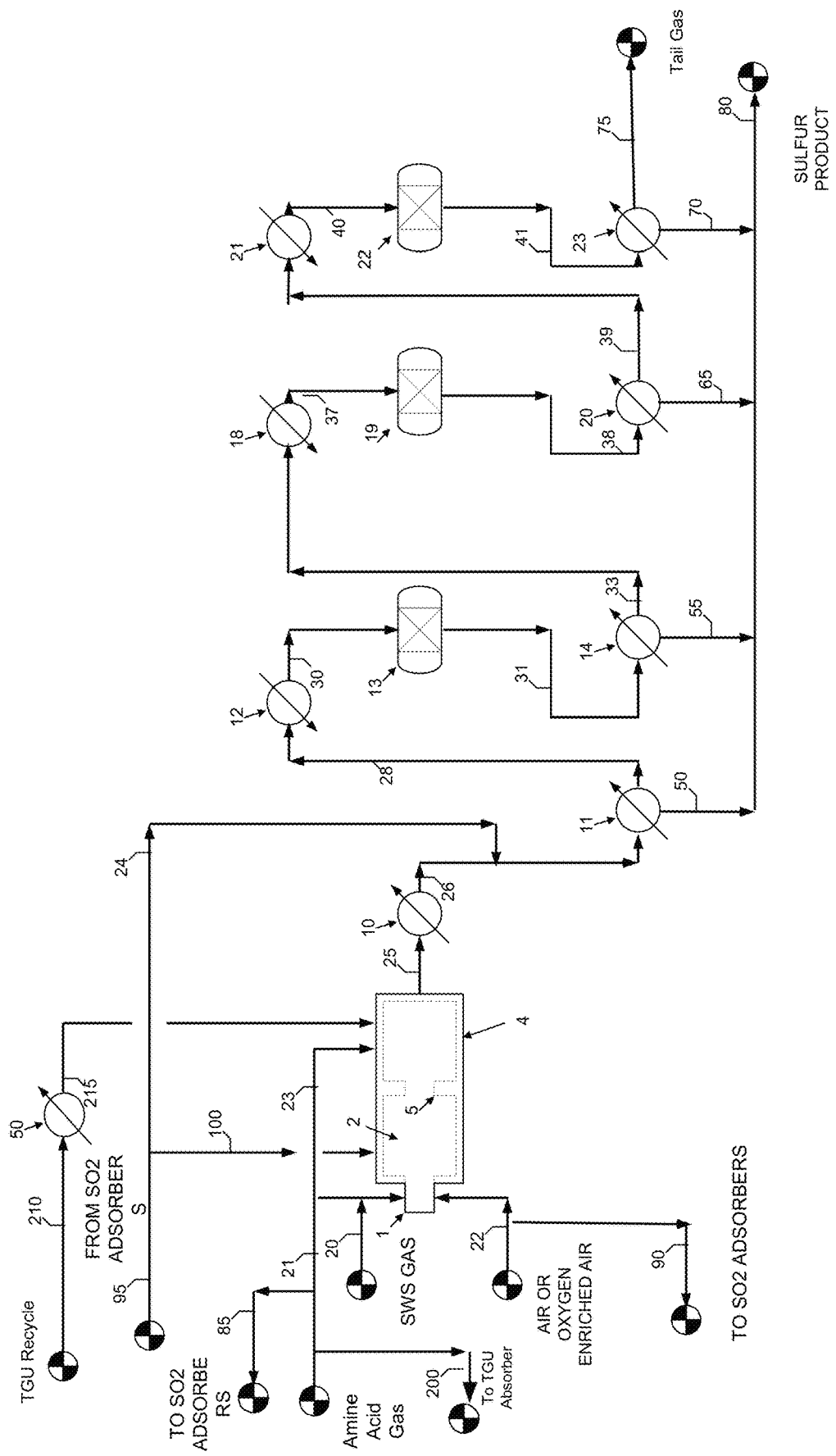
Figure 11:
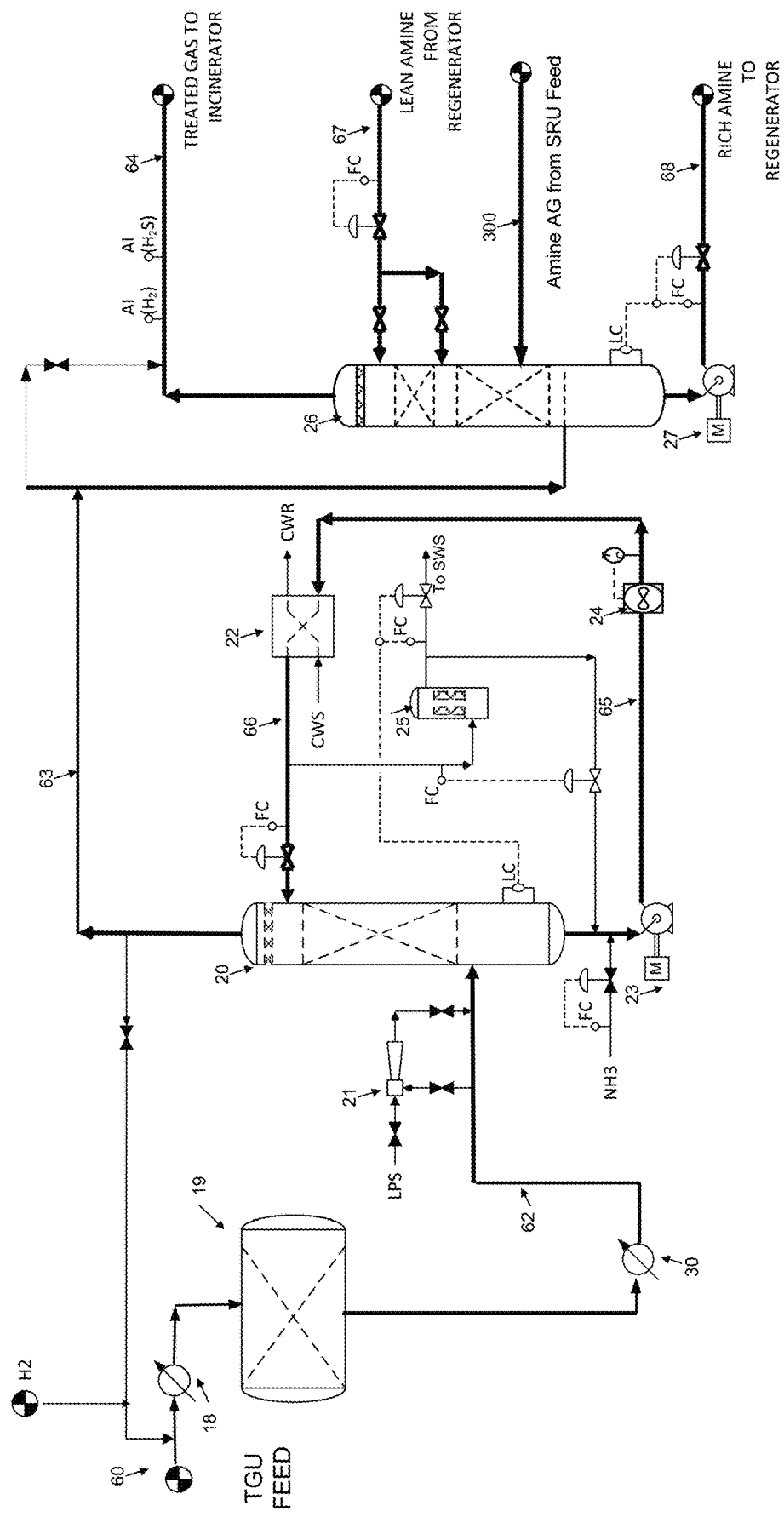

(a) 25% of the amine acid gas is sent to the tail gas absorber known as RICH-MAX Absorber stream 200 on FIG. 10 and shown on FIG. 11 as acid gas stream (300) from the SRU; the modification to the prior art is the slip stream of the acid gas is sent to the present invention and the recycle from the present invention is sent to the thermal section of the prior arts.

(b) The tail gas absorber overhead stream 64 flows to the modified incineration and then flows to the present invention SO2 Adsorbers;

(c) Up to 75% of the amine acid gas is sent to the prior art thermal section;

(d) The tail gas absorber operates at higher rich loading (0.2-0.3 mol/mol);

(e) The tail gas recycle from the tail gas regeneration unit is recycled to the SRU but not to the first zone, as stream (210) instead:

The acid gas from the tail gas regeneration column, which is hydrocarbon/mercaptan free, is recycled back to the SRU. It is preheated and flows to the second zone of the reaction furnace. The combusted gas from the prior arts zone 1 reaction furnace flows to the second zone through choke ring where the temperature is above ignition temperature, and burn the acid gas in the second zone and the combusted;

(f) In the modified prior arts the tail gas absorber is designed with 0.2 to 0.3 mol/mol loading. The acid gas loading in the prior arts tail gas absorber is normally 0.1 mol/mol maximum, and the acid gas loading for the prior arts amine absorber is 0.3 mol/mol, it means there is significant free amine in the tail gas absorber to process the portion of the acid gas. The prior arts tail gas absorber acts not only as a tail gas absorber but also as an enriched absorber without adding significant cost to the project. This scheme also removes the hydrocarbons/mercaptans, which cause problems in the second zone of the reaction furnace. As H2S concentration increases the 25% slipstream from the SRU feed to the tail gas absorber may be reduced as long the combustion temperature of 1100° C-1150° C. in the first zone of the reaction furnace is achieved.

The FIG. 4 and FIG. 5 will remain the same where the RICH-MAX tail gas absorber overhead flows to the modified incineration system and the cooled combusted gas flows to the present invention FIG. 5 and the same operation take place to achieve near zero emission.

In summary, the SO2 Adsorbers innovative process can be added after the incineration to any type of sulfur recovery and the tail gas treating technology from the conventional Claus ranging up to 98% sulfur recovery, to any sub dew point processes like CBA, MCRC, Smartsulf, Sulfreen, and SuperSulf or similar ranging up to 99.9% sulfur recovery, to any direct reduction and direct oxidation, like SuperClaus, EuroClaus, SMAX, and SMXB or similar ranging up to 99.9% sulfur recovery, and to any tail gas treating like BSR, ARCO RICH-MAX and SCOT or similar ranging up to 99.9% sulfur recovery, and catalytic incineration or similar which by adding the present invention results near to zero SO2 emission is achieved.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A method for abating the emissions of at least sulfur dioxide present in gases emitted from sulfur recovery plants, comprising:

providing at least one first adsorber unit that operates in an adsorption mode to sorb and remove at least the sulfur dioxide out of a tail gas containing sulfur dioxide, and also providing at least one other second adsorber unit that operates in a regeneration mode that receives an acid gas slip stream comprising hydrogen sulfide and also an oxygen-containing gas so as to desorb at least the sulfur dioxide from this said at least one other second adsorber unit to produce a regeneration gas comprising at least sulfur dioxide and hydrogen sulfide, wherein the first and second adsorber units are configured such that these first and second adsorber units are alternately switched between an adsorption mode and a regeneration mode;

passing a tail gas comprising sulfur dioxide through the at least one first adsorber unit so as to sorb and remove the sulfur dioxide out of this tail gas while passing an acid gas slip stream comprising hydrogen sulfide and also an oxygen-containing gas through the at least one other second adsorber unit to regenerate this second adsorber unit and provide an off-gas comprising sulfur dioxide and hydrogen sulfide;

discharging the gas emitted from the at least one first adsorber unit through a stack or a vent, and recycling the off-gas emitted from the at least one second adsorber unit back to a sulfur recovery unit; and switching the mode of operation of the said at least first adsorber unit so that it receives an acid gas slip stream comprising hydrogen sulfide and also an oxygen-containing gas and is regenerated, and switching the mode of operation of the said at least second adsorber unit so that it receives a tail gas comprising sulfur dioxide and removes at least the sulfur dioxide out of this tail gas, wherein the adsorbent material within the at least one first adsorber unit and/or the at least one second adsorber unit is selected from the group consisting of alumina catalyst, activated alumina catalyst, alumina/titania catalyst, titania catalysts, iron with nickel, chromium, cobalt with molybdenum, molybdenum, manganese, cobalt, and one or more combinations thereof.

2. A method according to claim 1, wherein the at least one first adsorber unit, when in the adsorption mode, operates at a temperature in the range of about 125° C. to about 130° C., and the at least one second adsorber unit, when in the regeneration mode, operates at a temperature of about 320° C. to about 400° C.

3. A method according to claim 1, wherein the off-gas emitted from the at least one second adsorber unit is recycled back to a Claus equipment thermal section, a Claus equipment catalytic section or a tail gas hydrogenation reactor.

4. A method according to claim 1, wherein the method reduces sulfur dioxide emissions to less than 10 ppmv.

5. A method according to claim 1, wherein the tail gas stream contains at least one selected from the group consisting of hydrogen sulfide, ammonia, hydrogen cyanide, hydrogen gas, carbon monoxide, carbon dioxide, oxygen gas, carbonyl sulfide, nitrogen gas, carbon disulfide, hydrocarbons, mercaptans, sulfur vapours, steam and combinations thereof.

6. A method according to claim 1, wherein the adsorbent material within either of the at least one first adsorber unit and/or the at least one second adsorber unit is a titanium catalyst in conjunction with an alumina adsorbent for scavenging oxygen present at a relatively lower section of the at least one first adsorber unit and/or at least one second adsorber unit.

7. A method according to claim 1, wherein the acid gas slip stream is derived from either an outlet of a waste heat boiler, an outlet of a sulfur condenser or from a tail gas treating unit.

8. A method according to claim 1, wherein the tail gas is derived from a quench column, a tail gas adsorber overhead, and/or a vent stream from a sulfur pit.

9. A method according to claim 1, wherein the off-gas emitted from the at least one second adsorber unit is recycled back to a feed stream directed into a sulfur recovery unit, a reaction furnace, a waste heat boiler, a condenser outlet, and/or a tail gas treating unit.

10. A method according to claim 1, wherein the quantity of oxygen-containing gas is adjusted such that the hydrogen sulfide to sulfur dioxide mole ratio in the gas fed into the sulfur recovery unit is in the range of 1.5:1 to 10:1.

11. A system for abating the emissions of at least sulfur dioxide present in gases emitted from sulfur recovery plants, comprising:
at least one first adsorber unit that operates in an adsorption mode to sorb and remove at least the sulfur dioxide out of a tail gas containing sulfur dioxide, and also at least one other second adsorber unit that operates in a regeneration mode that receives an acid gas slip stream comprising hydrogen sulfide and also an oxygen-containing gas so as to desorb at least the sulfur dioxide from this said at least one other second adsorber unit to produce a regeneration gas comprising at least sulfur dioxide and hydrogen sulfide, wherein the first and second adsorber units are configured such that these first and second adsorber units are alternately switched between an adsorption mode and a regeneration mode;
means for passing a tail gas comprising sulfur dioxide through the at least one first adsorber unit so as to sorb and remove the sulfur dioxide out of this tail gas while passing an acid gas slip stream comprising hydrogen sulfide and also an oxygen-containing gas through the at least one other second adsorber unit to regenerate this second adsorber unit and provide an off-gas comprising sulfur dioxide and hydrogen sulfide;
means for discharging the gas emitted from the at least one first adsorber unit through a stack or a vent, and recycling the off-gas emitted from the at least one second adsorber unit back to a sulfur recovery unit; and
means for switching the mode of operation of the said at least first adsorber unit so that it receives an acid gas slip stream comprising hydrogen sulfide and also an oxygen-containing gas and is regenerated, and switching the mode of operation of the said at least second adsorber unit so that it receives a tail gas comprising sulfur dioxide and removes at least the sulfur dioxide out of this tail gas, wherein the adsorbent material within the at least one first adsorber unit and/or the at least one second adsorber unit is selected from the group consisting of alumina catalyst, activated alumina catalyst, alumina/titania catalyst, titania catalysts, iron with nickel, chromium, cobalt with molybdenum, molybdenum, manganese, cobalt, and one or more combinations thereof.

12. A system according to claim 11, wherein the at least one first adsorber unit, when in the adsorption mode, operates at a temperature in the range of about 125° C. to about 130° C., and the at least one second adsorber unit, when in the regeneration mode, operates at a temperature of about 320° C. to about 400° C.

13. A system according to claim 11, wherein the off-gas emitted from the at least one second adsorber unit is recycled back to a Claus equipment thermal section, a Claus equipment catalytic section or a tail gas hydrogenation reactor.

14. A system according to claim 11, wherein the system reduces sulfur dioxide emissions to less than 10 ppmv.

15. A system according to claim 11, wherein the tail gas stream contains at least one selected from the group consisting of hydrogen sulfide, ammonia, hydrogen cyanide, hydrogen gas, carbon monoxide, carbon dioxide, oxygen gas, carbonyl sulfide, nitrogen gas, carbon disulfide, hydrocarbons, mercaptans, sulfur vapours, steam and combinations thereof.

16. A system according to claim 11, wherein the adsorbent material within either of the at least one first adsorber unit and/or the at least one second adsorber unit is a titanium catalyst in conjunction with an alumina adsorbent for scavenging oxygen present at a relatively lower section of the at least one first adsorber unit and/or at least one second adsorber unit.

17. A system according to claim 11, wherein the acid gas slip stream is derived from either an outlet of a waste heat boiler, an outlet of a sulfur condenser or from a tail gas treating unit.

18. A system according to claim 11, wherein the tail gas is derived from a quench column, a tail gas adsorber overhead, and/or a vent stream from a sulfur pit.

19. A system according to claim 11, wherein the off-gas emitted from the at least one second adsorber unit is recycled back to a feed stream directed into a sulfur recovery unit, a reaction furnace, a waste heat boiler, a condenser outlet, and/or a tail gas treating unit.

20. A system according to claim 11, wherein the quantity of oxygen-containing gas is adjusted such that the hydrogen sulfide to sulfur dioxide mole ratio in the gas fed into the sulfur recovery unit is in the range of 1.5:1 to 10:1.

* * * * *